(12) United States Patent
Shuster et al.

(10) Patent No.: US 12,135,839 B2
(45) Date of Patent: Nov. 5, 2024

(54) DEVICE FOR PHYSICAL INTERACTION BETWEEN REMOTELY LOCATED USERS

(71) Applicants: Brian Shuster, Vancouver (CA); Gary Stephen Shuster, Vancouver (CA)

(72) Inventors: Brian Shuster, Vancouver (CA); Gary Stephen Shuster, Vancouver (CA)

( * ) Notice: Subject to any disclaimer, the term of this patent is extended or adjusted under 35 U.S.C. 154(b) by 0 days.

(21) Appl. No.: 18/380,552

(22) Filed: Oct. 16, 2023

(65) Prior Publication Data
US 2024/0036651 A1 Feb. 1, 2024

Related U.S. Application Data

(63) Continuation of application No. 17/962,727, filed on Oct. 10, 2022, now Pat. No. 11,822,726, which is a continuation of application No. 17/475,985, filed on Sep. 15, 2021, now Pat. No. 11,467,671, which is a continuation of application No. 16/553,070, filed on Aug. 27, 2019, now abandoned, which is a (Continued)

(51) Int. Cl.
*G06F 3/01* (2006.01)
*G06F 3/041* (2006.01)
*H04L 67/10* (2022.01)

(52) U.S. Cl.
CPC .......... *G06F 3/016* (2013.01); *G06F 3/04144* (2019.05); *H04L 67/10* (2013.01); *G06F 2203/04102* (2013.01); *G06F 2203/04103* (2013.01)

(58) Field of Classification Search
None
See application file for complete search history.

(56) References Cited

U.S. PATENT DOCUMENTS 7,009,595 B2 * 3/2006 Roberts ................ G09B 21/004
715/702
8,332,755 B2 12/2012 Zhang et al.
(Continued)

OTHER PUBLICATIONS

Daniel Leithinger, Sean Follmer, Alex Olwal and Hiroshi Ishii; "Physical Telepresence: Shape Capture and Display for Embodied, Computer-mediated Remote Collaboration"; Oct. 5, 2014; 10 pages; ACM, Honolulu, HI, USA.

*Primary Examiner* — Stephen T. Reed
(74) *Attorney, Agent, or Firm* — Sherrie M. Flynn; Aisha O. Otori; Coleman & Horowitt LLP

(57) ABSTRACT

An electronic device for touch translation includes a body and pins extending therefrom and including couplings to facilitate movement of a first portion relative to a second portion. The pins are controllable to more the first portion relative to the second portion and to control force applied by the pins on an external object. Heads are disposed on the pins, which heads are greater in width than the pins and are moveable relative to the pins about respective couplings. Sensors cooperating with the pins detect forces applied to the pins and a communication subsystem communicates over a network, with a remote electronic device. A controller based on detected forces transmits signals to the remote electronic device to control the remote electronic device, and actuates pins to control the relative movement of the portions based on signals received from the remote electronic device.

14 Claims, 14 Drawing Sheets

Related U.S. Application Data continuation of application No. 15/092,507, filed on Apr. 6, 2016, now Pat. No. 10,394,363.

(60) Provisional application No. 62/144,283, filed on Apr. 7, 2015.

(56) References Cited

U.S. PATENT DOCUMENTS

| | | | |
|---|---|---|---|
| 8,558,677 B2 * | 10/2013 | Shuster | H04M 1/026 340/407.1 |
| 8,952,797 B2 | 2/2015 | Shuster | |
| 9,142,105 B1 * | 9/2015 | Crofford | G06F 3/016 |
| 9,167,061 B2 | 10/2015 | Shuster | |
| 9,384,640 B2 | 7/2016 | Shuster | |
| 9,544,407 B2 | 1/2017 | Shuster | |
| 2009/0184923 A1 | 7/2009 | Schena | |
| 2011/0045910 A1 | 2/2011 | Mckenna et al. | |
| 2015/0220199 A1 * | 8/2015 | Wang | G06F 3/016 345/173 |
| 2016/0163165 A1 | 6/2016 | Morrell et al. | |

* cited by examiner

DEVICE FOR PHYSICAL INTERACTION BETWEEN REMOTELY LOCATED USERS

CROSS-REFERENCE TO RELATED APPLICATION

This application claims priority to and is a continuation of U.S. patent application Ser. No. 17/962,727, filed on Oct. 10, 2022, which is a continuation of U.S. patent application Ser. No. 17/475,985, filed on Sep. 15, 2021, (U.S. Pat. No. 11,467,671, issued Oct. 11, 2022), which is a continuation of U.S. patent application Ser. No. 16/553,070, filed on Aug. 27, 2019, which is a continuation of U.S. patent application Ser. No. 15/092,507, filed on Apr. 6, 2016, (U.S. Pat. No. 10,394,363, issued Aug. 27, 2019), which claims priority under 35 U.S.C. § 119(e) to provisional application Ser. No. 62/144,283, filed Apr. 7, 2015, which applications are expressly incorporated by reference herein, in their entireties.

FIELD OF TECHNOLOGY

The present disclosure relates to devices for interaction between, for example, people located remotely from each other.

BACKGROUND

Electronic devices, such as smart phones, tablet computers, laptop computers, and desktop computers have gained widespread use for a variety of functions including communications functions. Video communication functions, utilizing video chat applications, are commonly used both for business and for personal use between people located remotely from each other, for example, between parents and children living in different locations, between spouses when one or both are travelling, between colleagues working in different locations, and so forth. Thus, interactions between people are commonly carried out remotely.

Interactions between people utilizing electronic devices for communication functions are limited, for example, to voice, video, or both voice and video communication.

Head-mounted displays may also be utilized for virtual interaction between individuals to provide a more realistic interaction. Such interactions, however, are only virtual and are limited to interaction in a virtual space.

Improvements in electronic devices to provide further interaction capabilities between people located remotely from each other are desirable.

SUMMARY

An electronic device for touch translation is provided. The electronic device includes a body, a plurality of pins extending from the body, the pins including couplings to facilitate movement of a first portion of the pins relative to a second portion of the pins, the pins being controllable to control the movement of the first portion relative to the second portion and to control a force applied by the pins on an external object, sensors cooperating with the pins to detect forces externally applied to the pins, a communication subsystem for communication, over a network, with a remote electronic device, and a controller coupled to the pins, the sensors, and the communication subsystem. The controller controls the electronic device to, based on detected forces externally applied to the pins, transmit a signal to the remote electronic device for the control of the remote electronic device, and to, based on signals received from the remote electronic device, actuate ones of the pins to control movement of the first portion relative to the second portion and to control the force applied by the pins on the external object.

BRIEF DESCRIPTION OF THE DRAWINGS

Embodiments of the present disclosure will now be described, by way of example only, with reference to the attached Figures, in which.

DETAILED DESCRIPTION

Figure 1:
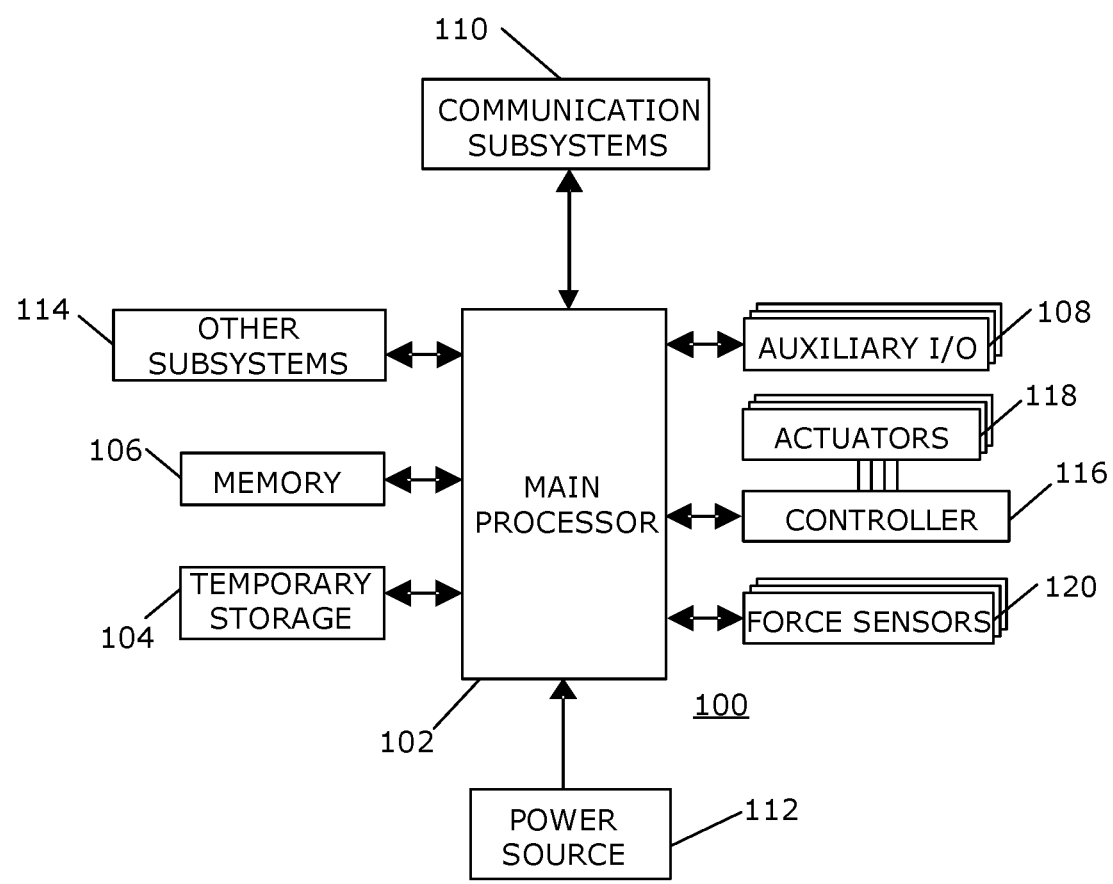
FIG. 1 is a block diagram of an example of an electronic device for touch translation in accordance with one embodiment.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The following describes an electronic device and a method for touch translation. The electronic device includes a body, a plurality of pins extending from the body, the pins including connections or couplings to facilitate movement of a first portion of the pins relative to a second portion of the pins, the pins being controllable to control the movement of the first portion relative to the second portion and to control a force applied by the pins on an external object, sensors cooperating with the pins to detect forces externally applied to the pins, a communication subsystem for communication, over a network, with a remote electronic device, and a controller coupled to the pins, the sensors, and the communication subsystem. The controller controls the electronic device to, based on detected forces externally applied to the pins, transmit a signal to the remote electronic device for the control of the remote electronic device, and to, based on signals received from the remote electronic device, actuate ones of the pins to control the movement of the first portion relative to the second portion and to control the force applied by the pins on the external object.

A simplified block diagram of an example of an electronic device 100 for touch translation is shown in FIG. 1. The electronic device 100 includes multiple components, such as a main processor 102 that controls the overall operation of the electronic device 100. The electronic device 100 may be mounted to another object or device, may include mounting brackets or geometry to facilitate mounting to another object or device, or may be in the form of a sheet for resting on a surface. According to one example, the electronic device 100 is incorporated into a case for another electronic device such as a smartphone or tablet computer. Alternatively, the electronic device 100 may be incorporated or integrated into another electronic device such as a portable electronic device, smartphone, or tablet computer. The electronic device 100 may also be generally transparent and may be overlaid on a display of another electronic device such as a smartphone or tablet computer. Thus, the display on which the electronic device 100 is overlaid may be a touch-sensitive display. Optionally, the electronic device 100 is manually removable when not in use. Alternatively, the electronic device 100 may be opaque or partially opaque and is included in a cover that covers part or all of the display 118 when utilized. For example, the electronic device 100 may be incorporated into a phone case that is manually located over the display to close the case over the display prior to touching the electronic device 100, which may include holding the electronic device 100 to the face of the user.

The main processor 102 interacts with other components of the electronic device 100, including, for example, a temporary storage device 104, a memory 106, an auxiliary input/output (I/O) subsystem 108, a communication subsystem 110, a power source 112, and, optionally, other subsystems 114. Additionally, the main processor 102 interacts with a controller 116 that is coupled to actuators 118 that are utilized to control movement of pins, also referred to as fingers, about connections or couplings within the pins.

The actuators 118 may be, for example, linear actuators, hydraulic actuators, pneumatic actuators, magnetic actuators, or any combination of different types of actuators that are coupled to parts of the pins to control movement of one portion of a pin relative to another portion of the pin or to control the elevation, or distance of an end of the pin relative to a body from which the pins extend, of one of the pins relative to the resting elevation of the pins. The controller 116 is coupled to the main processor 102 and, based on signals from the main processor 102, controls the actuation of the actuators 118.

The force sensors 120 are associated with the pins, for example, are located at the ends of the pins of the electronic device 100 to detect external forces that are applied to the pins, such as forces from a user's hand, finger, thumb, face, appendage, or other items held by a user applying force to the pins of the electronic device 100. The force sensors 120 may be disposed in the pins, on the pins, under the pins, or any suitable combination of in, on, and under the pins to detect forces on the pins. Thus, an external force applied to the pins of the electronic device 100 is detected utilizing the force sensors 120. The actuators 118 may also be utilized to apply a force, by the pins, on an external object, such as the user's hand, finger, thumb, face, appendage, or other items, held by a user applying force to the pins.

The temporary storage device 104 may be, for example, Random Access Memory (RAM) that stores data that is processed by the main processor 102. The memory 106, such as flash memory, is utilized for persistent storage. The memory 106 may be utilized to store an operating system and software programs or components that are executed by the processor 102.

The optional auxiliary input/output (I/O) subsystem 108 may include an interface through which, for example, a USB controller or other peripheral device may be connected. Other input/output subsystems may also be utilized as well as other communications.

The communication subsystem 110 receives signals from a communication device such as a portable electronic device, smart phone, tablet computer, laptop or other device (not shown) and sends signals through the communication device to which the electronic device 100 is coupled. Thus, for example, the signals from the force sensors 120 or other commands from the main processor 102 may be sent via the communication subsystem 110. The communication subsystem 110 is also responsible for receiving signals via the communication device for processing by the main processor 102 to cause actuation of the actuators 118, via the controller 116, in response to signals from the communication device.

The power source 112 may be one or more of rechargeable batteries, capacitors, inductive charging, inductive power, fuel cells, a port to an external power supply to power the electronic device 100.

The systems and subsystems that interact with the main processor 102 and are described herein are provided as examples only. Other subsystems 114 may also interact with the main processor 102.

Although not shown in the block diagram of FIG. 1, the electronic device 100 may optionally include other devices and subsystems. For example, the electronic device 100 may include a display device or display devices for displaying information such as pictures or other information on the pins, one or more speakers for audio output, one or more cameras for capturing images, which may include video, short-range communications, proximity sensors, and other suitable devices or subsystems.

Figure 2:
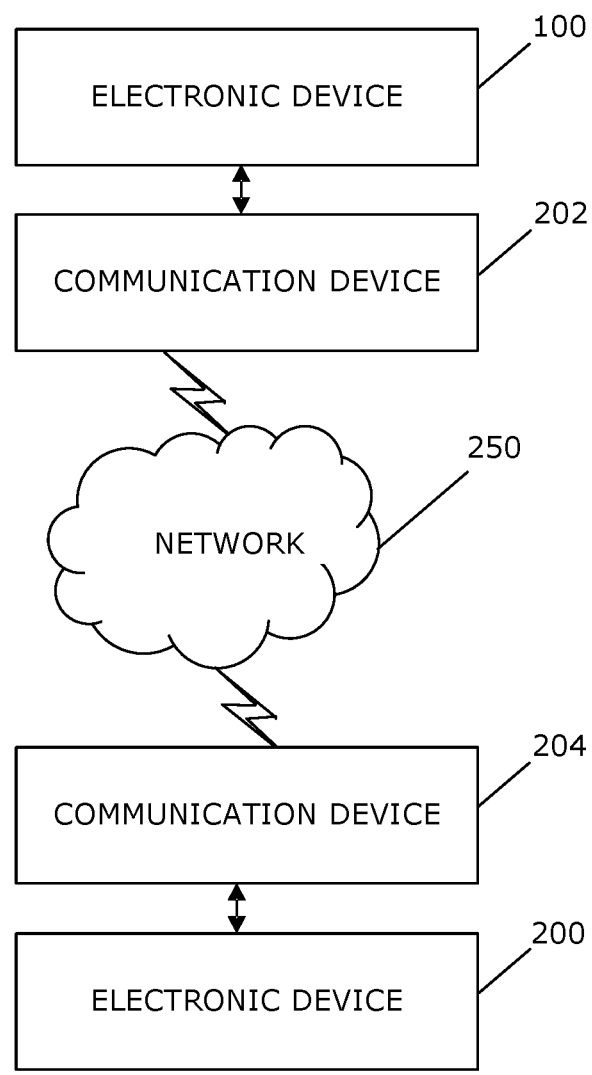
FIG. 2 is a block diagram of an example of a system for touch translation including the electronic device of FIG. 1.

Referring to FIG. 2, a system for touch translation including the electronic device 100 is shown. In this example, the electronic device 100 communicates with a similar electronic device 200 that is located remotely from the electronic device 100 by sending signals to the remotely located electronic device 200 via the communication device 202 to which the electronic device 100 is coupled, through a network 250 and through a remotely located communication device 204. The electronic device 100 also receives signals from the remotely located electronic device 200 via the communication device 202, the network 250, and through the remotely located communication device 204.

As indicated above, the communication device 202 may be a portable electronic device, smart phone, tablet computer, laptop or other device that is in communication with the electronic device 100 via the communication subsystem 110 of the electronic device 100. The electronic device 100 may optionally be physically coupled to the communication device 202. For example, the electronic device 100 may be coupled to a back side of the communication device 202.

Similarly, the remote communication device 204 may be a portable electronic device, smart phone, tablet computer, laptop or other device that is in communication with the remote electronic device 200 via a communication subsystem of the remote electronic device 200. The remote electronic device 200 may optionally be physically coupled to the communication device 204.

The network 250 may include the internet and may include a cellular network in addition to the internet or as an alternative to the internet. Several communication devices may communicate through the network 250. Other communications may also be utilized, including for example, near field, Bluetooth®, WiFi, optical, radio, or a combination of communications.

Thus, the electronic device 100 is operable to communicate with the remote electronic device 200. When a communication session begins, signals are transmitted from the electronic device 100 to the remote electronic device 200 in response to detecting an externally applied force on the pins of the electronic device 100. The signals are sent to the remote electronic device 200 to control the remote electronic device 200. In response to receipt of signals at the electronic device 100, from the remote electronic device 200, the actuators are controlled to control movement of the pins of the electronic device 100 and force applied by the pins of the electronic device 100 on an external object, such as a user's hand, finger, thumb, face, appendage, or other items, held by a user applying force to the pins. Thus, a force applied by a user on the electronic device 100 is determined and, movement of the pins of the remote electronic device 200 is controlled and a resulting force is applied by the remote electronic device 200. Similarly, a force applied by a remote user on the remote electronic device 200 is determined and a resulting force is applied by the electronic device.

A user pressing on the pins on the electronic device 100 at the same time that a remote user presses on the remote electronic device 200, feels the return force caused by the user pressing on the remote electronic device 200.

Figure 3A:
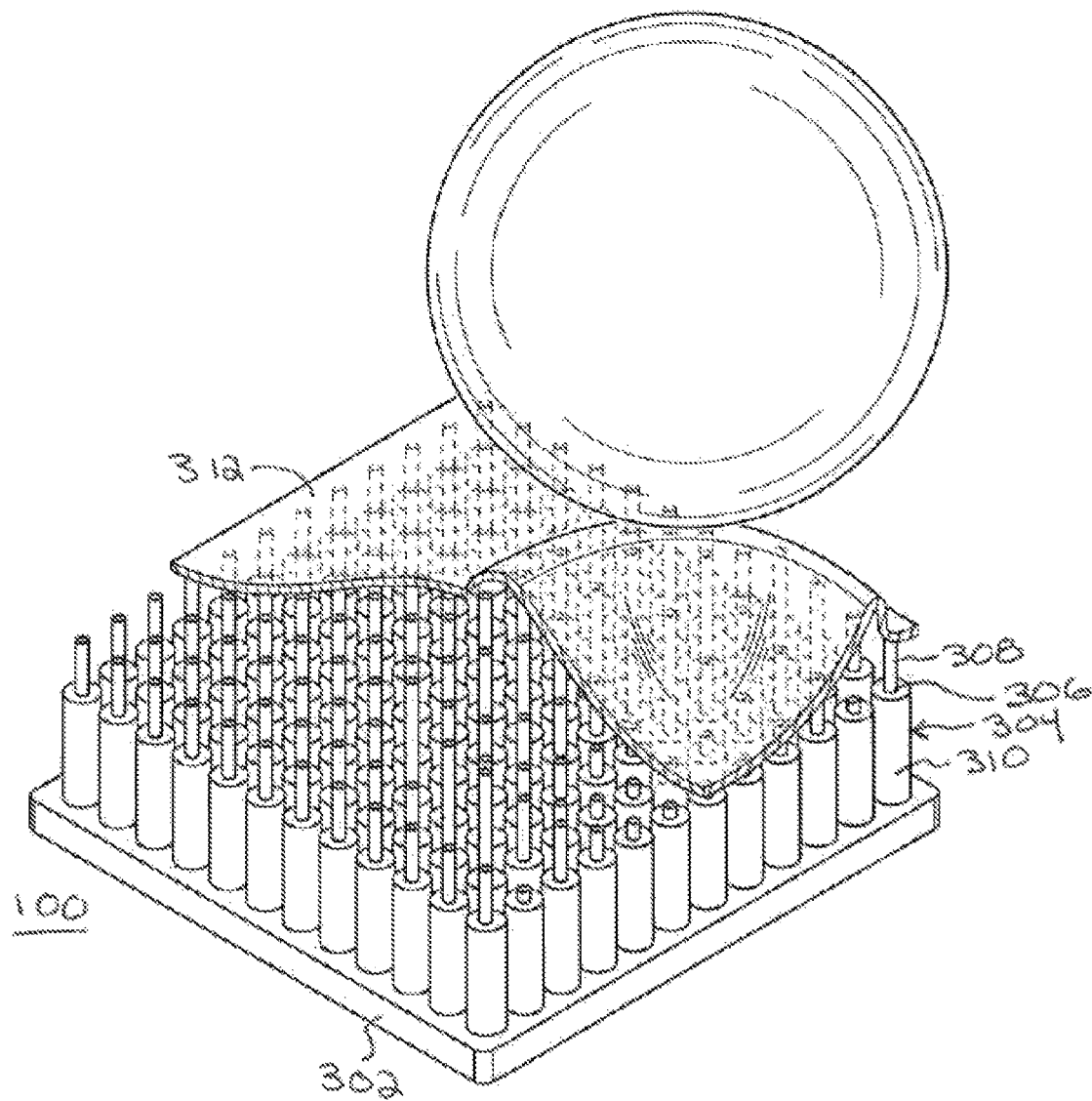
FIG. 3A is a perspective view of one example of an electronic device in accordance with the embodiment of FIG. 1.
Figure 3B:
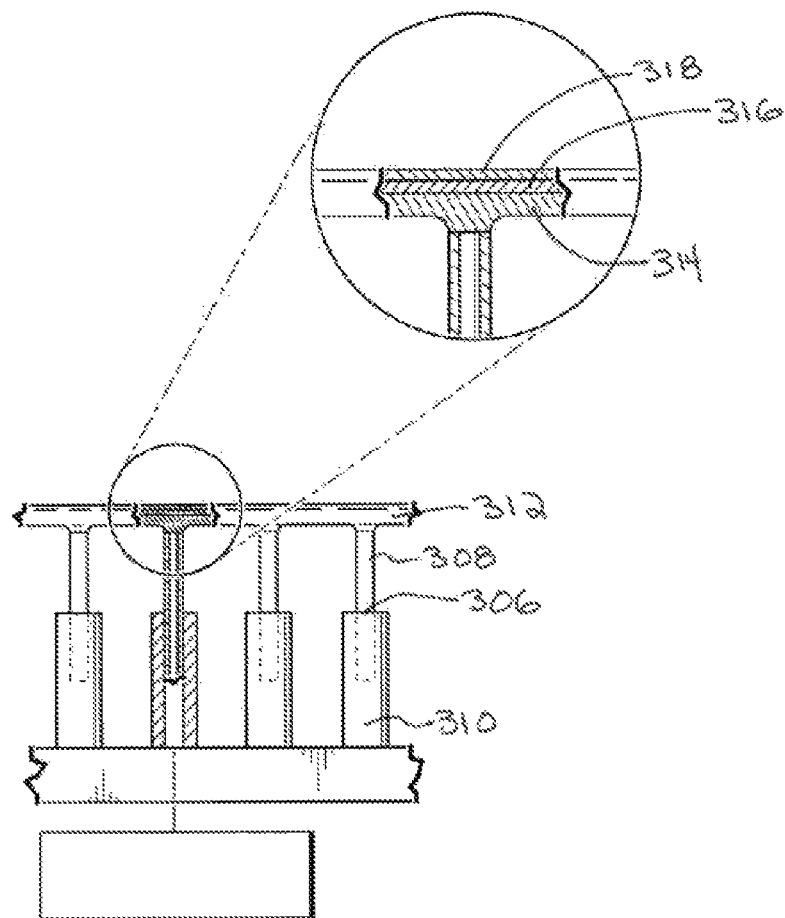
FIG. 3B is a partial side view of the electronic device of FIG. 3A.
Figure 3C:
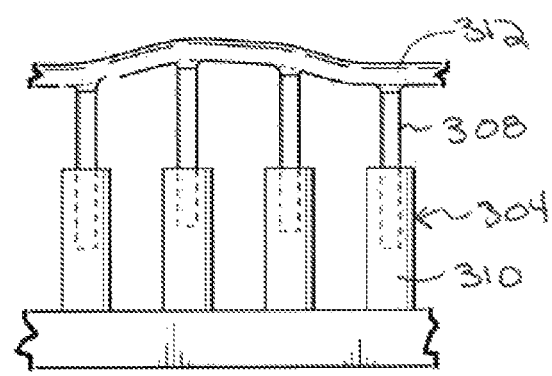
FIG. 3C is a partial side view of the electronic device of FIG. 3A.

A perspective view of one example of an electronic device is shown in FIG. 3A through FIG. 3C. The electronic device 100 includes a body 302 in which the components illustrated in FIG. 1 are disposed. The body 302 may be rigid. Alternatively, the body 302 may be flexible while still providing protection for the components shown in FIG. 1. The plurality of pins 304 extend from the body 302. In the present example, the pins 304 extend generally linearly away from the body 302. Each pin 304 includes coupling 306 such that a distal portion 308 or outer portion of the pin 304 is moveable relative the proximal portion 310 or inner portion of the pin. The proximal portion 310 is coupled to the body 302 while the distal portion 308 is coupled at the coupling 306 to the proximal portion 310.

For the purpose of the present example, the distal portion 308 is moveable relative to the proximal portion 310, toward and away from the body 302. Movement of a pin 304 and any force applied by a pin on an external object that is in contact with the end of the distal portion 308 of the pin 304 or a cover or membrane coupled to the distal portion 308 of the pin 304, is controlled by an actuator, such as a linear actuator, which may be, for example, a hydraulic actuator or pneumatic actuator. The linear actuator is coupled to the controller to thereby control sliding movement of the distal portion 308 relative to the proximal portion 310 of the pin 304, and force applied by the pin 304. In this example, coupling comprises a telescoping coupling and the sliding movement of the distal portion 308 relative to the proximal portion 310 is a telescoping movement.

For the purpose of this example, the pins 304 are covered by a flexible, elastic membrane 312 such as a latex, flexible PVC, CyberSkin® or a combination of flexible, elastic materials. Thus, in this example, the pins 304 and membrane 312 are part of a user interface of the electronic device 100.

The flexible, elastic membrane 312 may also be comprised of multiple layers of materials. For example, the flexible, elastic membrane 312 may include a first layer 314 that couples to at least some of the pins 304, for example, by a mechanical interlock with sockets in the layer or an adhesive layer that facilitates application of forces by the pins 312, away from the body 302 and toward the body 302. The flexible, elastic membrane 312 may include a second layer 316 of, for example CyberSkin®, and a third layer 318 of, for example, a very thin latex. The very thin latex may be replaceable.

Figure 3D:
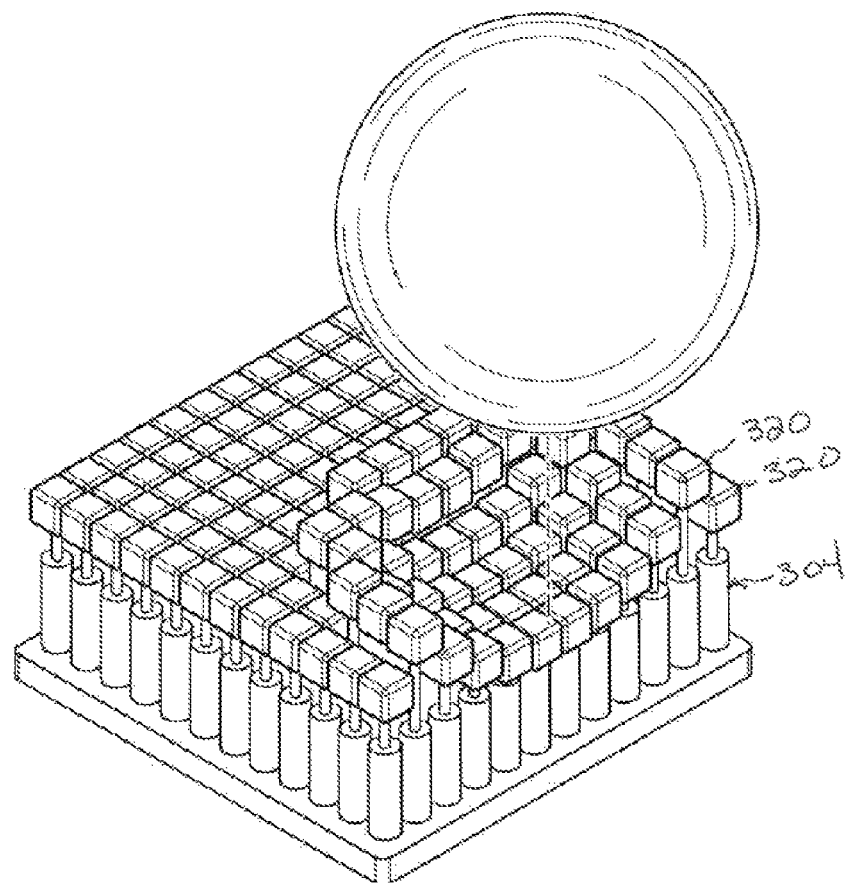
FIG. 3D is a perspective view of another example of an electronic device in accordance with the embodiment of FIG. 1.
Figure 3E:
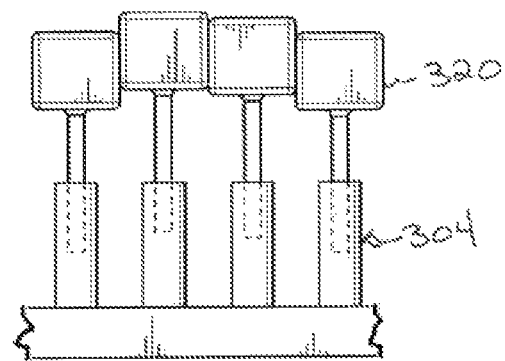
FIG. 3E is a partial side view of the electronic device of FIG. 3D.

Alternatively, heads 320 may be disposed on the ends of the pins 304 and the heads are larger in diameter than the body of the pins 304, as illustrated in the example of FIG. 3D and FIG. 3E. In this example, no membrane 312 is present. The heads 320 may be a different material or materials than the pins 304.

Referring again to FIG. 3A through FIG. 3C, the plurality of the pins 304 extend from the body 302, in a dense array of pins 304 that are each, individually actuatable. In addition to being actuatable, the pins 304 are depressible by an externally applied force. Such an externally applied force is detected utilizing the force sensors 120. The force sensors may be coupled to the pins such that each pin is associated with a respective force sensor for detecting the externally applied force on that associated pin.

In accordance with the present example, the pins 304 are small relative to a human finger, thumb, hand, appendage, or face and are disposed in a dense array on the body 302 such that an external force exerted, for example, by a human finger, is exerted on a plurality of the pins 304. Thus, force may be applied to tens or hundreds of pins 304 by a user's finger pressing on the electronic device 100. As a result of the relatively high number and density of pins 304, a force is applied on the pins 304, which together are moved in the shape of the finger or other object that applies the force.

Referring again to FIG. 2, when an external force is applied to the pins 304, sufficient to cause the distal portion 308 of some of the pins 304 to move toward the body 302, signals are transmitted to the remote electronic device 200 that is in communication with the electronic device 100. When no external force is applied to pins at the remote electronic device 200, the pins at the remote electronic device 200 that correspond to the pins 304 to which the force is applied at the electronic device 100, are moved. The corresponding pins at the remote electronic device 200 are moved by moving the distal portion of the pins away from the body.

Thus, the ends of the pins 304 are moved toward the body 302 at the electronic device 100 to provide a depression in the surface that generally follows the contour and surface profile of the object, such as a finger, that applied the force to the pins 304. At the remote electronic device 200, ends of the corresponding pins are moved away from the body to form a projection that generally follows the contour and surface profile of the object that applied the force to the pins 304. The projection formed at the remote electronic device 200 is formed by the pins covered by the elastic membrane, giving the general appearance of the object that applied the force to the pins 304 at the electronic device 100.

In this example, the distal ends 308 of the pins 304 are moved at the electronic device 100 to form a depression in the surface of the membrane 312, and the distal ends of the pins are moved at the remote electronic device 200 to form a corresponding projection in the surface of the membrane. Thus, the pins at the remote electronic device 200 are moved in the opposite direction as the pins at the electronic device 100 to generally form an inverse profile.

When an external force is applied to the pins 304 at the electronic device 100, and an external force is applied to corresponding pins at the remote electronic device 200, the corresponding pins at the remote electronic device 200 apply a force to the external object applying a force at the remote electronic device 200. Similarly, the pins 304 at the electronic device 100 apply a force on the object applying the external force at the electronic device 100. The force applied by the pins at the remote electronic device 200 to the external object, generally corresponds in magnitude to the external force applied to the pins 304 at the electronic device 100. The force applied by the pins 304 to the external object at the electronic device 100 generally corresponds in magnitude to the external force applied to the pins at the remote electronic device 200.

Figure 4:
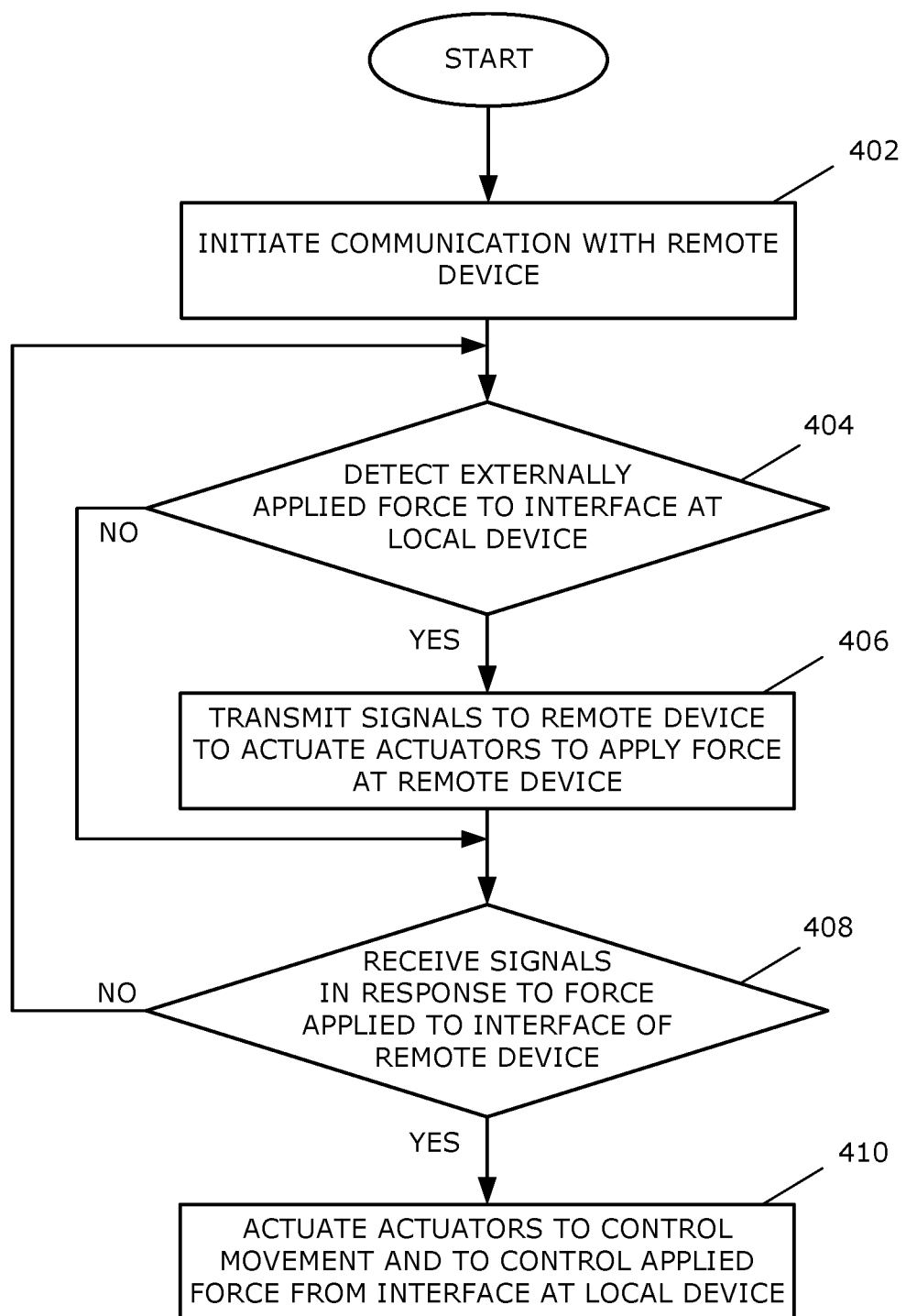
FIG. 4 is a flowchart illustrating an example of a method of controlling the electronic device according to embodiments.

A flowchart illustrating a method of controlling an electronic device, such as the electronic device 100 is shown in FIG. 4. The method may be carried out by software executed, for example, by the main processor 102 of the electronic device 100. Coding of software for carrying out such a method is within the scope of a person of ordinary skill in the art given the present description. The method may contain additional or fewer processes than shown or described, and may be performed in a different order. Computer-readable code executable by at least one processor to perform the method may be stored in a computer-readable medium, such as a non-transitory computer-readable medium.

A communication session is initiated 402 between the electronic device 100 and the remote electronic device 200. The communication session is started by one or both of the electronic device 100 and the remote electronic device 200. To initiate the communication session, the electronic device 100 and the remote electronic device perform a handshake process, for example, in response to user selection of an option to begin communicating with the remote electronic device 200. The communication session is secured utilizing known secure communications techniques, including, for example, encryption and decryption to provide security in transmission.

Initiation of a communication session may also include user authentication or identification. For example, knowledge-based identification, such as a passcode or a personal identification number, may be utilized. Alternatively or in addition, biometric identification, such as fingerprint, facial recognition, palm print, or geometry, or other biometric identification may be utilized. Such biometric identification may be carried out by pressing a hand, face, or other body part against the interface of the electronic device 100. A comparison is then made with stored data relating to the user's identification to confirm that the user is an authorized user of the electronic device 100. The electronic device may also identify contours of details of the hand or other body part and, optionally measure temperature to confirm the temperature of the person for use in authentication. Such biometric identification utilizing an imprint of a hand or other body part against the interface increases security over biometric identification methods of other devices. The length of time that the communication session lasts may be limited. For example, after a threshold period of time, the communication session may be discontinued unless authentication is repeated.

During the communication session, externally applied forces on the interface of the local electronic device 100 are detected utilizing the force sensors 120. In response to detecting an externally applied force on the interface at 404, signals are transmitted to the remote electronic device 200 at 406 to actuate the actuators to control movement of portions of the pins about the connections or couplings to thereby control movement and forces applied by the pins of the remote electronic device 200.

Signals are also received at the local electronic device 100. The signals are received from the remote electronic device 200 in response to externally applied forces that are detected at the remote electronic device 200.

In response to receipt of signals at the local electronic device at 408, the actuators 118 are actuated at 410 to control movement of portions of the pins about the couplings to thereby control movement and forces applied by the pins 304 of the local electronic device 100.

Because the pins 304 of the electronic device 100 include couplings 306 to facilitate movement of the distal portion 308 relative to the proximal portion 310, the pins 304 are movable toward and away from the body 302 and are operable to apply a force to an object touching the pins 304. In addition, the pins 304 are controlled to form a shape, such as a projection, that generally follows the contours and surface profile of an object touching the interface of a remote device that is in communication with the electronic device 100. Utilizing the movement of the pins 304 and force application, the electronic device 100, in cooperation with a remote electronic device 200, simulates touch between two people that are each utilizing a respective one of the electronic devices.

Utilizing such electronic devices 100, 200, touch contact is simulated to give the users the perception of touch. For example, a first user that presses on the pins 304 of the local electronic device 100, while a second user presses the pins of the remote electronic device 200, which is in communication with the local electronic device 100, perceives touch contact with the second user. For example, if both users rest their hands on the respective interface, the first user perceives that he or she is resting a hand on a hand of the second user. Similarly, the second user perceives that he or she is resting the hand on the hand of the first user. In another example, facial contact is perceived when the users press their faces against the interface.

Latency introduced from various sources such as transmission time, processing time, and actuation, may be of the order tens of milliseconds or greater. To reduce the problems introduced by latency and thus a lack of synchronization between the two electronic devices 100, 200, the software stored, for example, in the memory 106 at each electronic device, is utilized to smooth out actions and reactions to generally maintain the simulation of touch and facilitate perception of touch by each user.

The communication session or parts thereof may optionally be recorded by storing information relating the communication session. For example, received signals from an electronic device may be recorded by storing related information in the memory, such as the memory 106. For example, the signals received from a remote electronic device in response to a user placing his or her hand on the remote electronic device, may be stored and utilized later to reproduce the simulation of touch after the communication session has ended.

In the above-described method, the electronic device 100 enters a communication session with the remote electronic device 200 to simulate touch at both the electronic device 100 and at the remote electronic device 200. Optionally, the application of force and movement of the pins may occur at an electronic device, such as the electronic device 100, independent of a communication session with another electronic device. Signals may then be transmitted, for example, by a social networking platform, to share the signals with a recipient or with multiple recipients. For example, a touch may be broadcast to multiple recipients. In one example, a user places his or her lips on the electronic device and kisses the interface. The signals resulting from the kiss may be stored remotely for another user or users to obtain. For example, a movie star may make a kiss available for a plurality of fans to receive on their own electronic devices.

In another example, signals may be received at the electronic device 100 from a plurality of remote electronic devices and the signals may be combined, modified, averaged, or any combination thereof. Referring to the example of the movie star making a kiss available for a plurality of fans, the fans, in return, may make a kiss available for the movie star. Thus, a plurality of touches may be, for example, averaged to provide a combined response. Alternatively, a single, representative response, which may be from a single user, may be provided, where that response falls within a predetermined range of feedback.

According to another example, the electronic device 100 may be utilized by moving the user interface and applying forces to a user to simulate interaction with a virtual person or object.

Figure 5:
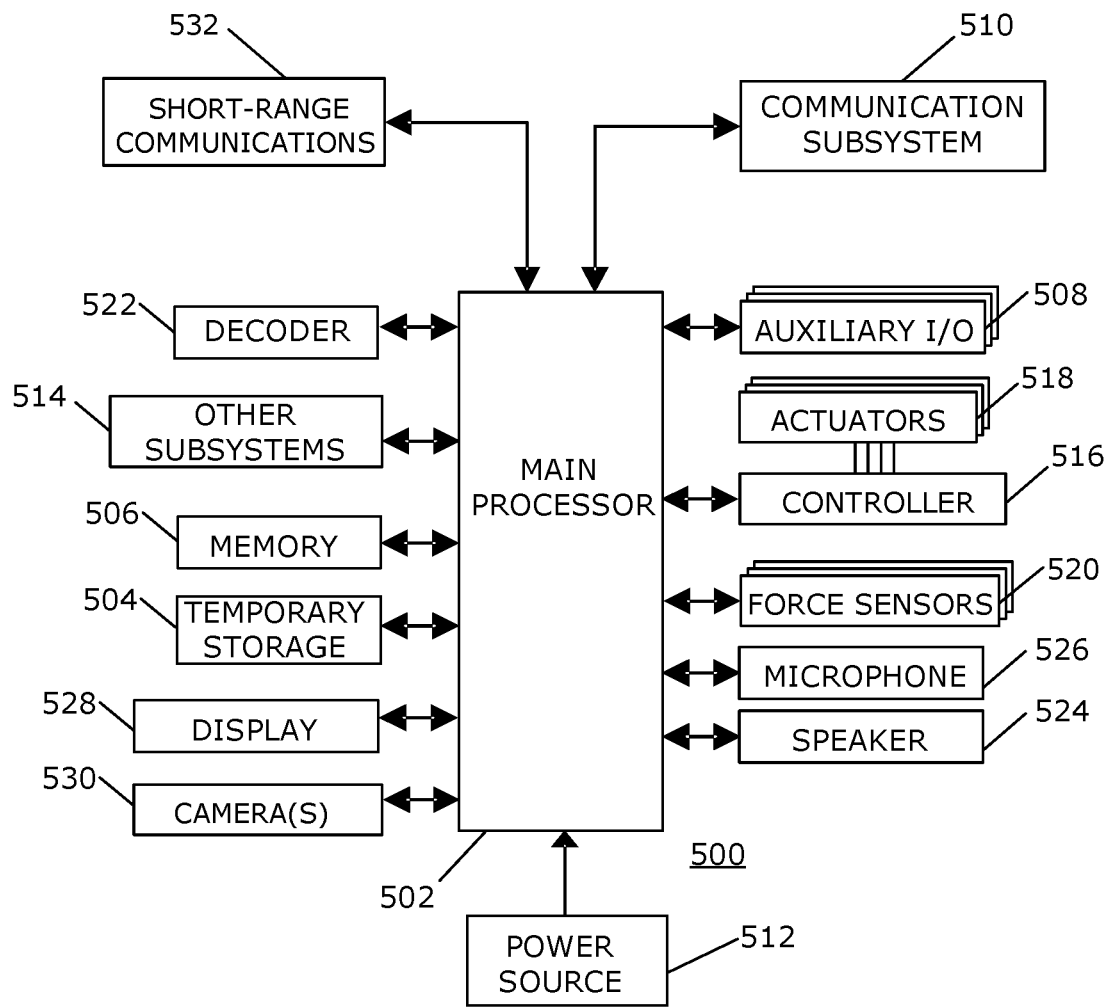
FIG. 5 is a block diagram of another example of an electronic device for touch translation in accordance with an embodiment.

A simplified block diagram of another example of an electronic device 100 for touch translation is shown in FIG. 5. In the example shown and described in FIG. 1, the electronic device 100 is utilized in conjunction with a communication device, such as a smartphone, tablet computer, or laptop computer, in order to communicate over a network with a remote electronic device. In the example shown in FIG. 5, the electronic device 500 may be utilized without connecting to a second device. Thus, the electronic device 500 in this example is operable to communicate over a network without the use another communication device.

Many of the elements or components referred to in FIG. 5 are similar to the elements or components in FIG. 1. For simplicity and clarity of illustration, the reference numerals are raised by 400 to indicate corresponding or analogous elements.

The electronic device 500 includes multiple components, such as a main processor 502 that controls the overall operation of the electronic device 100. As indicated, the electronic device 500 is operable to communicate, over a network, with a remote electronic device. The electronic device 500 in this example, may be any suitable size, depending on the application or intended use.

The main processor 502 interacts with other components of the electronic device 500, including, for example, a temporary storage device 504, a memory 506, an auxiliary input/output (I/O) subsystem 508, a communication subsystem 510, a power source 512, and, optionally, other subsystems 514. Additionally, the main processor 502 interacts with a controller 516 that is coupled to actuators 518 that are utilized to control movement of the pins about connections or couplings within the pins.

The functions of many of the components are similar to those described with reference to FIG. 1 and are therefore not described in detail again herein.

In the present example, communication functions are performed through the communication subsystem 110. Data received by the electronic device 100 is decompressed and decrypted by a decoder 522. The communication subsystem 510 receives signals from and sends messages to a network (not shown).

The main processor 502 may also interact with other components such as a speaker 524, a microphone 526, a display 528, one or more cameras 530, and short-range communications 532.

The speaker 524 outputs audible information converted from electrical signals, and the microphone 526 converts audible information into electrical signals for processing. The display 528 may be any suitable display or displays for displaying information, for example, on the pins. The display 528 may project an image or may be embedded in the pins or on heads that are disposed on the pins in order to display information, such as images, on the pins.

The camera or cameras 530 are utilized to obtain images or video of the user of the electronic device 500. Optionally, the cameras 530 may be utilized to obtain images or video of the user's surroundings as well. Each of the cameras includes the functional components for operation of the camera, including the lens, the image sensor, and, optionally, a light sensor and light source, such as infrared light emitting diodes (LEDs). The cameras may be one or more of visual light cameras, 3D sensing cameras, light field cameras, forward looking infrared cameras, near infrared cameras, ultraviolet cameras, or other imaging devices.

The short-range communications 532 may be utilized to perform various communication functions. For example, the short-range communications 532 may include Bluetooth or infrared (IR) communications capability for communicating with another electronic device, a peripheral device, or accessory.

Figure 6:
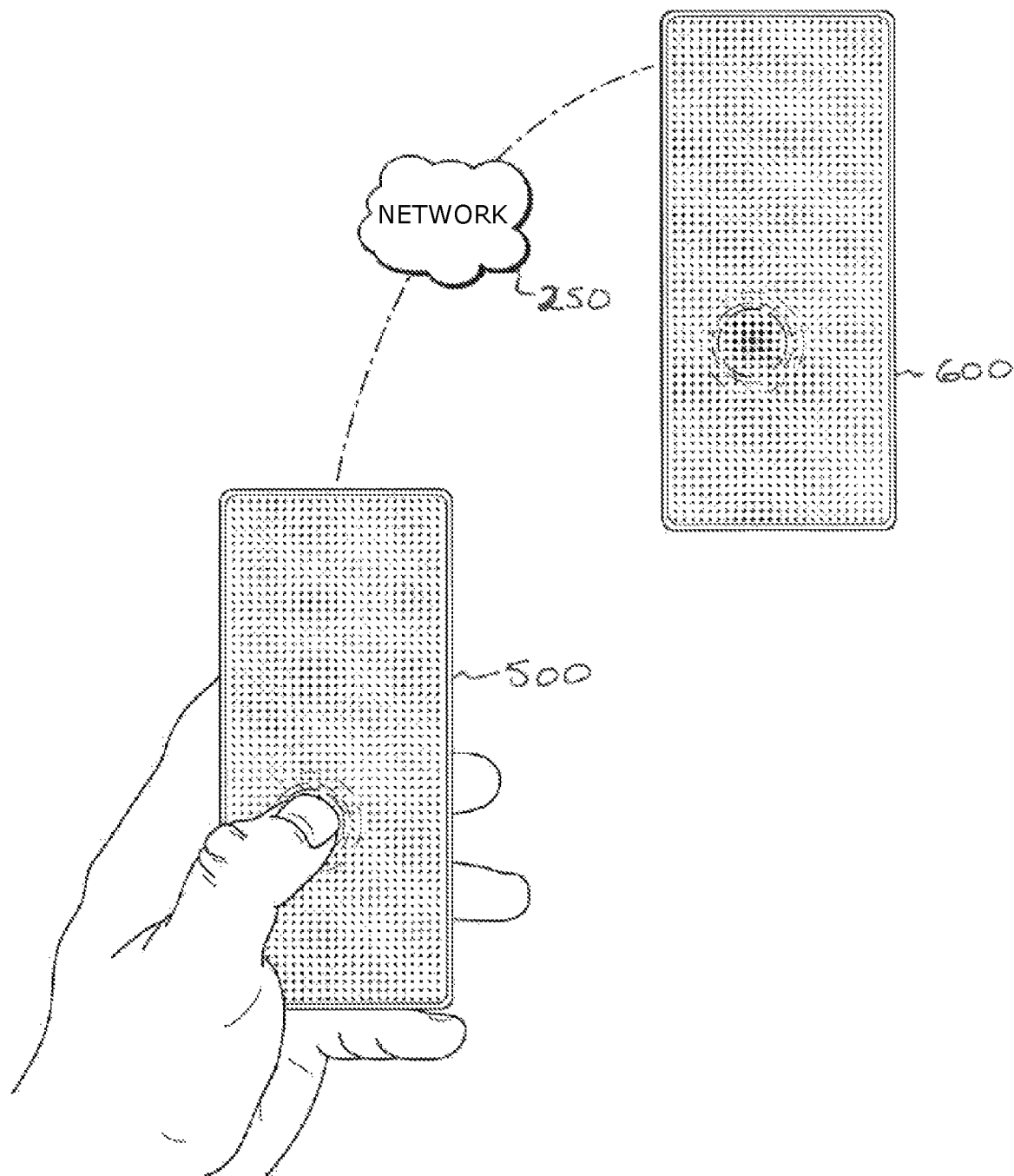
FIG. 6 is a simplified block diagram illustrating communication between electronic devices, such as the electronic device of FIG. 5, via a network.

Referring to FIG. 6, a system for touch translation including the electronic device 500 is shown. In this example, the electronic device 500 communicates with a similar electronic device 600 that is located remotely from the electronic device 500 by sending signals to the remotely located electronic device 600 via the network 250. The electronic device 500 also receives signals from the remotely located electronic device 600 via the network 250. Thus, no communication device is utilized in the present example of the electronic device 500 for communication via the network 250. The electronic device 500 is operable to communicate directly over the network 250.

Thus, the electronic device 500 is operable to communicate with the remote electronic device 600. When a communication session begins, signals are transmitted from the electronic device 500 to the remote electronic device 600 in response to detecting an externally applied force on the pins of the electronic device 500. The signals are sent to the remote electronic device 600 to control the actuators and thereby control the movement of pins and forces applied by the pins at the remote electronic device 600. In response to receipt of signals at the electronic device 500, from the remote electronic device 600, the actuators are controlled to control movement of the pins of the electronic device 500 and forces applied by the pins of the electronic device 500 on an external object, such as a user's hand, finger, thumb, face, appendage, or other items, held by a user applying force to the pins. Thus, a force applied by a user on the electronic device 500 is determined, movement of the pins of the remote electronic device 600 is controlled, and a resulting force is applied by the remote electronic device 600. Similarly, a force applied by a remote user on the remote electronic device 600 is determined and a resulting force is applied by the pins of the electronic device 500. The operation of the electronic device 500 may be similar to the operation of the electronic device 100 and thus, the operation is not further described herein.

The method described above and shown in FIG. 4 is also applicable to the electronic device shown in FIG. 5. The method may be carried out by software executed, for example, by the main processor 502 of the electronic device 500. Details of the method shown in FIG. 4 and described above are also applicable to the electronic device 500 and are therefore not described again herein.

As with the electronic device 100, the pins of the electronic device 500 include couplings to facilitate movement of portions of the pins and to facilitate application of a force to an object touching the pins. In addition, the pins are controlled to form a shape, such as a projection, that generally follows the contours and surface profile of an object touching the interface of the remote device 600 that is in communication with the electronic device 500. Utilizing the movement of the pins and force application, the electronic device 500, in cooperation with a remote electronic device 600, simulates touch between two people that are each utilizing a respective one of the electronic devices. Utilizing such electronic devices 500, touch contact is simulated to give the users the perception of touch.

The force that is applied by the electronic device 500 on the user or the force that is applied by the remote electronic device 600 on the remote user is controlled such that only forces that are within a predetermined range are transmitted. For example, signals that result from forces that are deemed to be outside of a safe range, for example, that may result in blunt trauma or sharp forces that may cause injury are not transmitted or are not utilized by the receiving electronic device. Alternatively, such forces may be altered, for example to reduce the speed of the force, reduce the sharpness, reduce the magnitude, or any suitable combination of these alterations in force.

One or both the remote electronic device 600 and the local electronic device 500 may compare the force or value representative of the force to a threshold limit to determine whether the force is within predetermined safety limits. This method may be carried out, for example in the method shown and described above with reference to FIG. 4. Thus, the method is carried out by software executed, for example, by the main processor 502 of the electronic device 500. Coding of software for carrying out such a method is within the scope of a person of ordinary skill in the art given the present description. Additional or fewer processes may also be performed and computer-readable code executable by the processor 502 to perform the method may be stored in memory 506.

Thus, as part of the process, for example, at 404 of FIG. 4, the processor 502 of the electronic device 500 may compare the force or a value representative of the force to a threshold limit stored in memory 506. In response to determining that the force or value meets or exceeds the threshold limit, the processor 502 of the electronic device 500 does not transmit the associated signals to the remote electronic device 600 such that the force is not applied to user of the remote electronic device 600. On the other hand, in response to determining that the force or value is less than the threshold limit stored in memory 506, the signals are transmitted and the force is applied to the user of the remote electronic device 600.

In addition, as part of the process, for example, at 408 of FIG. 4, the electronic device 500 may compare signals received from the remote electronic device 600 to predetermined values prior to actuating actuators to apply forces, by the local electronic device 500, to the user. In response to determining that the force or value meets or exceeds the threshold limit, the processor 502 of the electronic device 500 does not actuate the actuators such that the force is not applied to user of the local electronic device 500. On the other hand, in response to determining that the force or value is less than the threshold limit stored in memory 506, the force is applied to the user of the remote electronic device 600.

The size or shape, such as the width across which the force is applied may also be utilized such that forces from very sharp objects are not transmitted to the user. For example, the threshold limit may vary depending on the dimensions, such as width, across which the force is applied to the pins of the electronic device 500. Thus, for example, the electronic device 500 may maintain a lookup table in memory 506 and the threshold limit that is utilized for the comparison is identified from the lookup table and is dependent on dimensions including length and width of the applied force.

Optionally, the output may be scaled relative to the input such that, for example, inputs provided by a baby or a person with neuromuscular damage, which are by nature relatively weak, are amplified by some factor. Such scaling is also useful where one of the users desires touch that is stronger or weaker than the other user normally provides.

A perspective view of another example of an electronic device is shown in FIG. 7. Although the electronic device 500 described with reference to FIG. 5 is referred to in the present description with reference to FIG. 7, the present description is equally applicable to the electronic device 100 described herein with reference to FIG. 1.

Figure 7A:
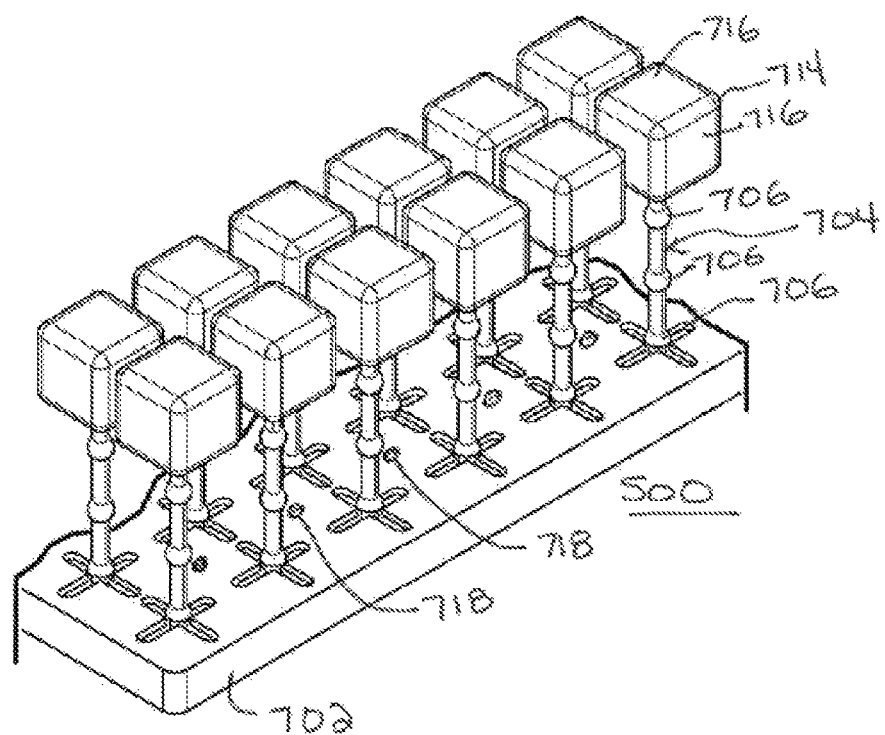
FIG. 7A is a perspective view of another example of an electronic device in accordance with an embodiment.
Figure 7B:
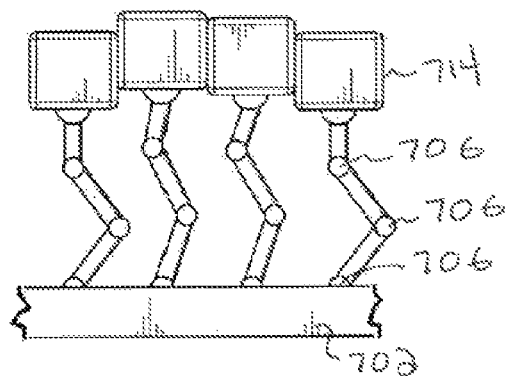
FIG. 7B is a partial side view of the electronic device of FIG. 7A.

The electronic device 500 includes a body 702 in which the components illustrated in FIG. 1 are disposed. The body 702 may be rigid. Alternatively, the body 702 may be flexible while still providing protection for the components therein. The plurality of pins 704 extend generally away from the body 702. In the present example, the pins 704 each include a plurality of couplings 706, which are articulating joints. The couplings 706 in each pin 704 may include more than one type of articulating joint to facilitate various types of movements of portions of the pins 704. Although three joints 706 are illustrated in the Example of FIG. 7, fewer or more joints may be utilized to facilitate movement of the portions of the pins 704. The articulating joints may include, for example, hinge joints, prismatic or sliding joints, revolute joints, or any suitable combination of joints or other couplings. The couplings together provide a linkage to facilitate movement in more than one axis. Thus, the portions of the pins 704 are coupled together about couplings to facilitate movement in all directions, as shown in FIG. 7B. In addition, all or a subset of the pins 704 may be coupled to the body 702 utilizing a coupling, for example, to facilitate gliding movement of the pins 704 relative to the body 702.

Figure 7C:
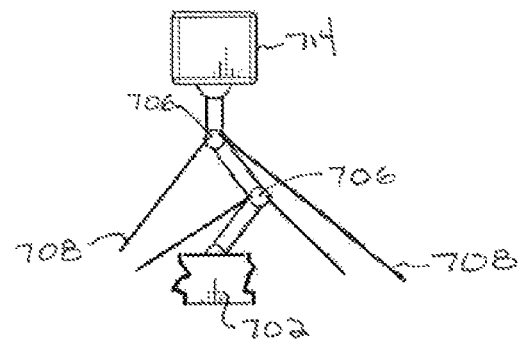
FIG. 7C is a side view of an example of a pin of the electronic device of FIG. 7A.
Figure 7D:
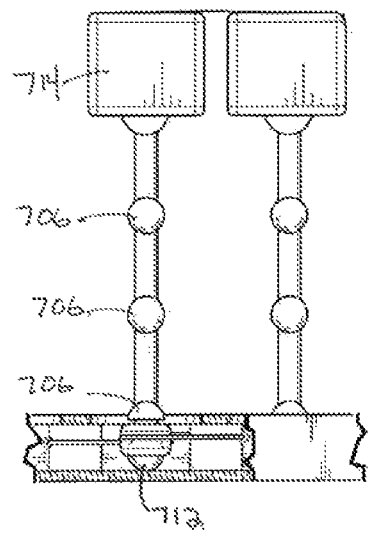
FIG. 7D is a partial side view of the electronic device of FIG. 7A with a portion of a body of the electronic device broken away.

Movement of the pins 704 about the couplings 706 may be controlled by wires 708, for example, that couple portions of the pins 704 to the body 702 or to other portions of the pins 704, as illustrated in FIG. 7C. The wires 708 may be controlled by actuation of the actuators 518. For example, the wires may be pulled when actuators 518 of the electronic device 500 are actuated to move the heads 714 on the pins 704 about a coupling. Optionally, some or all of the pins 704 may be disposed on rollers 712 on the body 714 to facilitate movement of the pins 704 relative to the body 714, as shown in FIGS. 7A and 7D.

The pins 704 are movable along the body 702 in a sliding or gliding motion, movable, toward and away from the body 702. Different portions of the pins 704 are also moveable relative to the body 702 to facilitate movement of the pins 704 in other directions. Movement of the pins 704 and any force applied by a pin 704 on an external object that is in contact with a head 714 on the pin 704, is controlled by multiple actuators that cooperate to control movement and force applied by the pin 704. Thus, the heads 714 on the pins 704 are movable in three dimensions facilitating flexion, extension, rotation, adduction, abduction, or any combination thereof, of the pins 704.

Figure 7E:
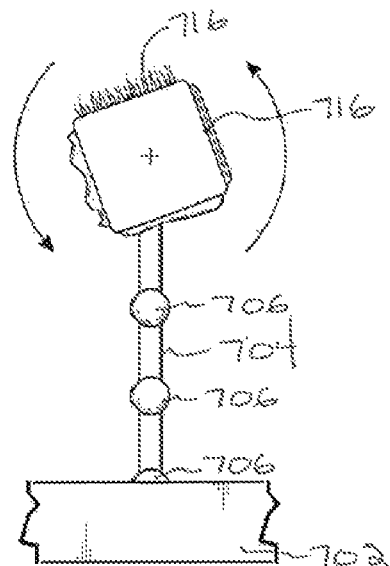
FIG. 7E is a side view of an example of a pin of the electronic device of FIG. 7A.
Figure 7F:
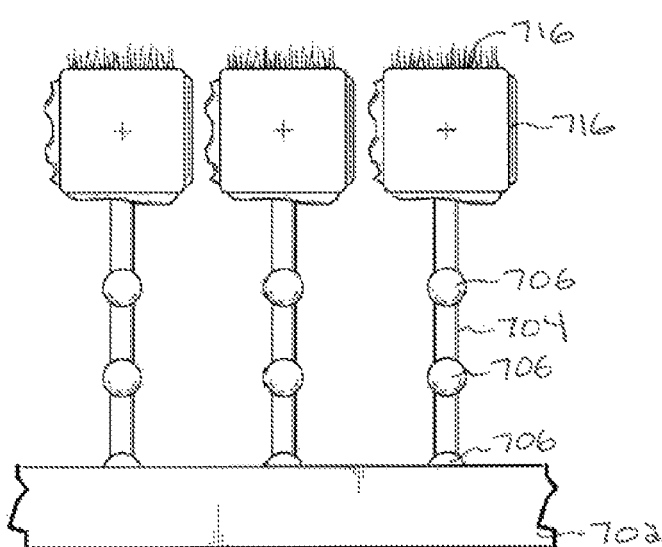
FIG. 7F is a partial side view of the electronic device of FIG. 7A.

In this example, heads 714 are mounted on the ends of the pins 704. The heads 714 are geometrically shaped to include a plurality of facets 716 and are coupled to the pins 704 to facilitate rolling of the heads 714 relative to the pins 704 to select which of the facets 716 is exposed or directed outwardly. Thus, the head 714 may be rolled to expose any one of, for example, four facets 716 depending on the application. Each facet 716 may have different material properties to provide different sensations to the touch, as illustrated in FIG. 7E and FIG. 7F. For example, the four facets 716 may include one facet covered by a material such as latex or CyberSkin®, a second facet covered with very fine wisps of hair or hair-like material on a silicone or material base, a third facet covered by a more dense coat of hair; and a fourth facet covered by a cloth material. Thus, depending on which of the facets 716 is exposed at the end of each of the pins 704, the heads 714 are utilized to simulate the feel of different surfaces or textures.

As in the embodiment described herein with reference to FIG. 3, a plurality of the pins 704 extend from the body 702, in a dense array of pins 704 that are, individually actuatable and each individual actuator within the pins is actuatable. In addition to being actuatable, the pins are depressible or flexed by an externally applied force. Such an externally applied force is detected utilizing the force sensors 520. The force sensors 520 are disposed on the pins 704 to detect externally applied static or dynamic forces including, for example, compressive force, frictional force, tensile force, torsion, and any combination of such forces.

The pins 704 are small relative to a human finger, thumb, hand, appendage, or face and are disposed in a dense array on the body 702 such that an external force exerted, for example, by a human finger, is exerted on a plurality of the pins 704. Thus, force may be applied to tens of pins 704, hundreds of pins 704, or more, by a user's finger pressing on the electronic device 500. As a result of the relatively high number and density of pins 704, such a force is applied on the pins 704, which together generally follow the contour and surface profile of the object that applied the force to the pins 304.

Because, the pins 704 are moveable in multiple axes in response to an externally applied force or in response to signals received via the communication subsystem 510, for example, and are operable to apply force in multiple directions against an external object, more complex touch interaction in which forces are applied in more than one direction or plane may be simulated. In addition, further contours and movement of the object that applied the force to the pins 304 may be formed in a similar, remote electronic device in communication with the local electronic device 500.

According to one example, an electronic device 500 may be held up to the throat of a user while a doctor manipulates a remote device that the doctor is using to simulate the feel of the glands of the user of the electronic device 500. Thus, the doctor manipulates the pins on the remote device such that the pins 704 apply a light force against the glands of the user. The size and contours of the glands may be determined by the doctor based on the reaction forces on the pins 704, which are utilized at the remote device to simulate the throat, which is the object to which the force is applied and that is applying the reaction forces against the pins 704. With sufficient sensitivity, a doctor can also detect the pulse as the pulse is simulated at the remote device.

Alternatively, the electronic device 500 may be utilized to simulate a physical handshake between remotely located users, hand holding, cheek touching, and any other suitable touch interaction.

In addition, with movement of the heads 714 relative to the body 702, for example, in a sliding or gliding motion, a rubbing or friction force may be simulated. To facilitate simulation of rubbing or friction, the electronic device 500 may optionally introduce noise into signals sent to a remote electronic device or received from the remote electronic device such that the movement of the heads 714 relative to the user is not smooth.

Referring again to FIG. 6, when an external force is applied to the pins 704, sufficient to cause flexion or movement of the pins 704 relative to the body 702, signals are transmitted to the remote electronic device 600 which is in communication with the electronic device 500. When no external force is applied to pins at the remote electronic device 600, the pins at the remote electronic device 600 that correspond to the pins 704 to which the force is applied at the electronic device 500, are moved. The corresponding pins are moved by moving the heads on the pins in an opposite direction relative to the body.

Thus, the heads 714 on the pins 704 are moved in a direction relative to the body 702 at the electronic device 500, for example, providing a depression in the surface that generally follows the contour and profile of the object, such as a finger, that applied the force to the pins 704. At the remote electronic device 600, the heads on the corresponding pins are moved in an opposite direction relative to the body, for example, forming a projection that generally follows the contour and profile of the object that applied the force to the pins 704. The projection formed at the remote electronic device 600 is formed by the heads on the pins, giving the general appearance of the object that applied the force to the heads 714 on the pins 704 at the electronic device 500.

Thus, the shape formed by the movement of the heads 714 on the pins 704 relative to the body 702 when an external force is applied to the heads 714 at the electronic device 500, is the inverse of the shape formed by the movement of the heads on the pins at the remote electronic device 600. For example, a user pressing down with a hand on the heads 714 on the pins 704 presses with the palm toward the body 702 of the electronic device 500. For the remote electronic device 600 in communication with the electronic device 500, the shape that is formed follows the contours of the hand, with the palm of the hand facing away from the body of the remote electronic device 600.

When external forces are applied to the heads 714 on the pins 704 at the electronic device 500, and external forces are applied to heads on corresponding pins at the remote electronic device 600, the heads on the corresponding pins at the remote electronic device 600 apply forces to the external object applying the forces at the remote electronic device 600. Similarly, the heads 714 on the pins 704 at the electronic device 500 apply forces on the object applying the external force at the electronic device 500. The forces applied by the pins at the remote electronic device 600 to the external object generally correspond in magnitude and direction to the external forces applied to the heads 714 on the pins 704 at the electronic device 500. The forces applied by the heads 714 on the pins 704 to the external object at the electronic device 500 generally correspond in magnitude and direction to the external forces applied to the heads on the pins at the remote electronic device 600.

Utilizing the movement of the heads 714 on the pins 704 and force application, the electronic device 500, in cooperation with a remote electronic device 600, simulates touch between two people that are each utilizing a respective one of the electronic devices. Utilizing such electronic devices 500, touch contact is simulated to give the users the perception of touch.

As described above, software may be utilized to smooth out actions and reactions to generally maintain the simulation of touch and facilitate perception of touch by each user to compensate, at least in part, for latency introduced from various sources.

In addition to simulating touch, the heads 714 may optionally be utilized to emit audio. For example, the heads 714 may be moved together to collectively emit audio, similar to a speaker.

The heads 714 may optionally be operable to be heated or cooled or both heated and cooled, for example utilizing a heating or warming fluid within the pins 704. Alternatively, a heating filament may be disposed within or around each head 714 or pin 704. Utilizing a heating element or fluid, the heads 714 may be heated, for example to about the skin temperature of the sender. In addition, a thermocouple may be included in the pins 704 or in the heads 714 to measure the temperature of the pins 704 or the heads 714.

In addition to detecting forces and to simulating forces or objects applied to a remote electronic device, the heads 714 on the pins 704 or the flexible, elastic membrane may be utilized to detect touches. For example, a patterned layer or layers of indium tin oxide may be deposited on the surface of the heads or on the surface of the elastic membrane for detecting touches thereon. For example, sensors may be disposed on or near the outer surface of the electronic device 500 for mutual-capacitance touch sensing.

Capacitive touch sensors may be used independently or in conjunction with other sensors to obtain input, for example to identify external contact with the device. For example, capacitive touch sensors may be used to distinguish between input that is a result of contact with skin, which is sensed utilizing capacitive sensors, or with a non-conductive object, which is not sensed utilizing capacitive sensors. The signals provided to the remote electronic device 600 may include such information to alter the tactile sensations provided to the user of the remote device 600. For example, in response to determining that the input is a result of contact with the skin, signals are sent to cause heating of the interface to simulate skin contact. In response to determining that the input is not a result of skin contact, the signals sent to the remote electronic device 600 do not result in heating of the interface. The recipient at the remote electronic device 600 may alter the touch interaction to scale the simulated contact, for example amplifying or reducing the force, to change the temperature, or to make any other suitable modification.

In another aspect, sensors, including capacitive touch sensors or proximity sensors may be utilized to modify, turn on, or turn off data transmission, reception, or implementation. For example, the electronic device 500 may be utilized to transmit signals to the remote electronic device 600 when the electronic device 500 is not being held up to the ear of the user. The electronic device may also modify the touch data or discontinue sending signals that result from the user holding the electronic device 500 being held up to the user's ear, such as for voice communication.

Referring to FIG. 7A, pores 718 in the body 702 are distributed generally evenly across the surface of the body 702, between the pins 714. Alternatively, pores may be concentrated in specific areas. The speaker 524 shown in FIG. 5 may be located in the body 702 to output audible information through the pores 718 and thus, at least some of the pores 718 are utilized as audio channels. Similarly, the microphone may be located in the body 702 to receive audible information through the pores.

The pores 718 shown in FIG. 7A are pores in the surface of the body 702. Alternatively, pins that include the pores may extend from the body 702. In the example in which the pores are included in the pins, the pins that include the pores do not include heads 714. For example, the pins may extend in between four heads 714 such that the pore is disposed between the four heads 714. Such pores may be utilized as audio channels. Alternatively, the pins that do not include heads 714 may be utilized as fluid conduits to express gas or liquid therefrom. The gas or liquid may be disposed in one or more reservoirs disposed in the body 702 and expressed via one or more of the pins that do not include heads 714.

Figure 7G:
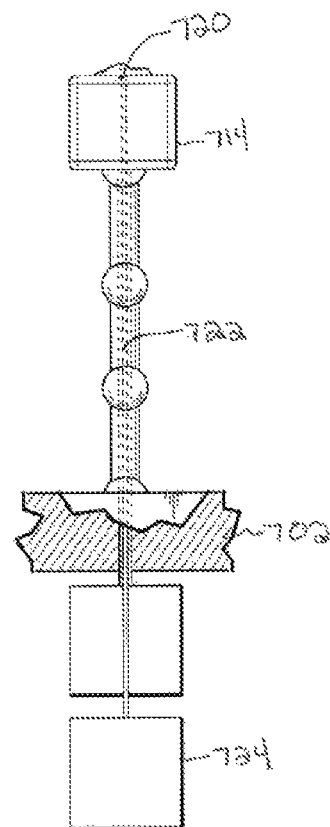
FIG. 7G is a partial side view of an example of a pin of the electronic device, showing hidden detail.

Optionally, pores 720 may be disposed in some of the heads 714, as illustrated in FIG. 7G. Some of the pores 718 are utilized to expel fluid, such as water, or to expel gas, such as air or to create suction. Thus, these pores 718 may be in communication with a reservoir, for example, to expel gas or liquid therefrom or in communication with a vessel to create a pressure difference to cause suction through the pores. Multiple pores may be disposed in each head 714 of at least some of the heads 714 to carry out various functions simultaneously.

In the example described above with reference to FIG. 7, a head 714 is disposed on each pin 704. Rather than pores 718 disposed in the body 702 of the electronic device 500, the pores may be disposed in the head 714 on the pins 704. Optionally, the pins 704 may have a hollow section or fluid conduit 722 in communication with a reservoir 724 for the passage of fluid through at least part of the pins 704 and through pores in the head 714.

Such pores may also be utilized for cleaning. For example, a cleaning fluid may, optionally be loaded into the device and expelled through the pores for cleaning the heads 714 on the pins 704 and the body 702. In this example, the pins 704 may move such that the heads 714 move relative to the body 702 in more than one direction to distribute the cleaning fluid across the electronic device and for self-cleaning.

Figure 8A:
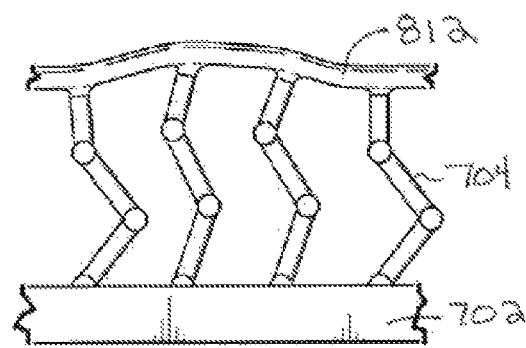
FIG. 8A is a side view of part of an electronic device in accordance with another embodiment.
Figure 8B:
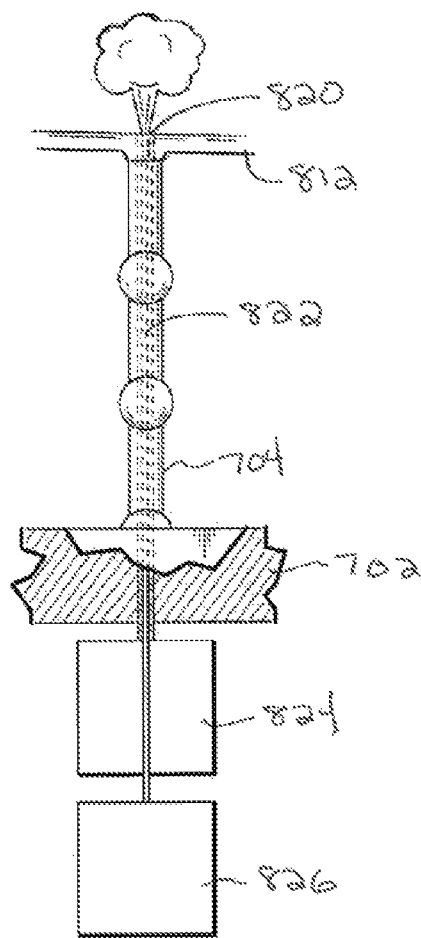
FIG. 8B is a side view of a pin of the electronic device of FIG. 8A, showing additional hidden detail.

According to another example embodiment, the pins 704 are covered by a flexible, elastic membrane 812 such as a latex, flexible PVC, CyberSkin® or a combination of flexible, elastic materials, as illustrated in FIG. 8A and FIG. 8B. In this example, the elastic membrane may include the pores 820 in communication with one or more hollow passages 822 or fluid conduits in the pins 704. The hollow passages 822 may be in fluid communication with one or more reservoirs, such as a liquid reservoir 824 and a gas reservoir 826.

Alternatively, the flexible elastic membrane may be coupled to the pins 704 and fluid may be pumped into areas in the flexible elastic membrane or a reservoir below the flexible elastic membrane to inflate the flexible elastic membrane, for example, to fill in areas between pins. The fluid may be warmed or cooled such that the fluid provides heat or is cool to the touch for improved simulation of touch.

Utilizing such pores 820, air or gas may be expelled, for example, to simulate blowing of air, and air may be sucked inwardly to create suction, for example, to simulate a kiss when a user at a remote device has his or her lips on the remote electronic device. The pores may also be utilized to detect when a person blows air onto the electronic device 500, by detecting changes in air pressure, sound, or both air pressure and sound, and pores at the remote electronic device may be utilized to expel air. The pores may also be utilized for the passage of sound, or light. Optionally, fine hair or hair-like material may be moved through the pores to simulate fine wisps of hair on human skin, for example.

As indicated, the pores may also be utilized for cleaning. The cleaning fluid may be expelled through the pores for cleaning the elastic membrane 812. The pins 704 may move relative to the body 702 to distribute the cleaning fluid across the membrane. Alternatively or in addition, the elastic membrane 812, may be wiped clean by the user.

In the above-described embodiments, the pins 704 are generally evenly distributed in an array across the body 702 and extend from the body 702. The pins 704 may be different sizes and may include different articulating joints or other couplings. For example, the pins 704 may be disposed on the body 702 such that the heads 714 of the pins 704 are disposed in different layers relative to the body 702. The pins 704 may be offset from each other but are disposed at different distances from the body. Thus, a pin may extend a greater distance from the body 702 than an adjacent pin. In one example, three layers of pins may be disposed on the body 702. The use of different layers of pins facilitates movement at greater depths, for example, for simulating a handshake or a hug. The stacked heads 714 also facilitate movement of the heads to cause a change in volume, for example, as heads move around from a stacked position to project outwardly, laterally or otherwise. The heads 714 on the pins may also be generally stacked on each other on the body 702.

As indicated above, the heads 714 may include displays 528 embedded therein or disposed thereon to display an image or images on the heads 714 on the pins 704. Images may be displayed on sides of the heads 714 as well as a top. When the pins are stacked, the images on the tops of the heads 714 and on the sides of the heads 714 provide depth to the image. The heads 714 or portions of the heads 714 may also be transparent such that an image or images are displayable through the heads 714. Each head 714 may include a single pixel or a plurality of pixels, similar to pixels of a liquid crystal display (LCD), for example. Together, the pixels on the heads 714 are utilized to display information, such as an image. Thus, the controller 516 and the main processor 502 may be utilized to identify the location of each of the heads 714 and to coordinate the color and brightness of the pixels of the heads 714 to provide the image.

Alternatively, a flexible display may be utilized on the pins such that the pins cause movement and flexing of the display. In this example, the display is disposed on the pins and is operable to display information such as images.

Alternatively, the heads 714 may be a set color. Rather than displays incorporated into the pins 704 or heads 714, images may be projected onto the heads 714. Images may also be displayed on the sides of the pins, to the extent that the sides of the pins are exposed. In this case, the pins themselves include displays embedded therein or disposed thereon. Alternatively, images may be projected onto the pins.

The pins may include optical fibers or similar elements that transmit visual data through the pins. Such fiber optic or similar elements may be utilized in conjunction with pin positioning to provide image depth.

Optionally, the cameras 530 may be utilized to obtain images or video of the user's surroundings as well. Each of the cameras includes the functional components for operation of the camera. Video or images from multiple cameras may be combined by programmatically stitching together the video or images.

The cameras 530 may be utilized to obtain images of video of the user and part of the user at which contact occurs. The images or video may be provided generally in real time or near real time.

Additionally, the pins 704 are movable relative to the body 702. The pins 704 are movable along the body 702 in a sliding or gliding motion, and movable toward and away from the body 702. Different portions of the pins 704 are also moveable relative to the body 702 to facilitate movement of the pins 704 in other directions. The pins 704 may be moved closer together or farther apart on the body 702. For example, the heads 714 on the pins or ends of the pins may be moved closer together by the various actuators controlling the couplings.

Optionally, the pins 704 may be grouped such that groups of the pins 704 may move together relative to the body 702. For example, the groups of pins 704 may be coupled to an intermediate seat or base that is coupled to the body 702. Sets or clusters of pins may swivel or pivot together on the base, relative to the body 702, about a point or axis. Sets or clusters of pins may also move together with the base, away from the body 702 or toward the body 702.

The movement pins 704 is controlled programmatically to facilitate the movement of individual pins 704 together as a group and to control the movement of sets of pins 704 together. Thus, for example, when a set of pins 704 move together on a base, relative to the body, other pins may move to accommodate the movement of the set of pins, such that the movement of pins 704 does not interfere with movement of other pins 704.

The movement of groups of pins together also facilitates the simulation of more complex touch interactions in which forces are applied in more than one direction or plane, by comparison to the simulation of a surface or applied force in one direction.

When grouped together, the pins, along with the base on which the pins are disposed, may be removed and loaded on the body, for example, similar to the loading of a cartridge. Thus, pins that are worn or not working may be replaced by replacing a cartridge that includes a plurality of the pins.

Alternatively, the heads of the pins may be replaceable, for example, in the circumstance in which the heads wear out faster than the pins. The heads may be detachable or decouplable and the pins and heads programmatically controlled such that the heads are decoupled from the pins and new, replacement heads are coupled to the pins. For example, the pins may extend into a cartridge that includes replacement heads, where a replacement head is attached, and the pins are then retracted.

In addition, cartridges of pins may be selected based on the material or materials on the heads on the pins. For example, a cartridge may be selected to simulate a surface of a hand or to simulate clothing. Thus, rather than having different facets on the heads on the pins, cartridges of pins may be selected to simulate different surfaces.

The body may be any suitable size. As indicated above, the electronic device may be incorporated into a case for a smart phone. The body may also be much larger. For example, the body may be incorporated into a case or a part of a tablet computer. The body may be the size of a desk, small or large, or may be the size of a mattress. Two electronic devices in communication with each other may also be different sizes.

In the example of FIG. 6, the electronic device 500 may be the size of a desk. The remote electronic device 600, however, may be incorporated into a case for a smart phone. The electronic device may be configured to compensate for differences in size of the electronic device, for example, to fill in parts of an object for which signals or information is not transmitted.

Figure 9:
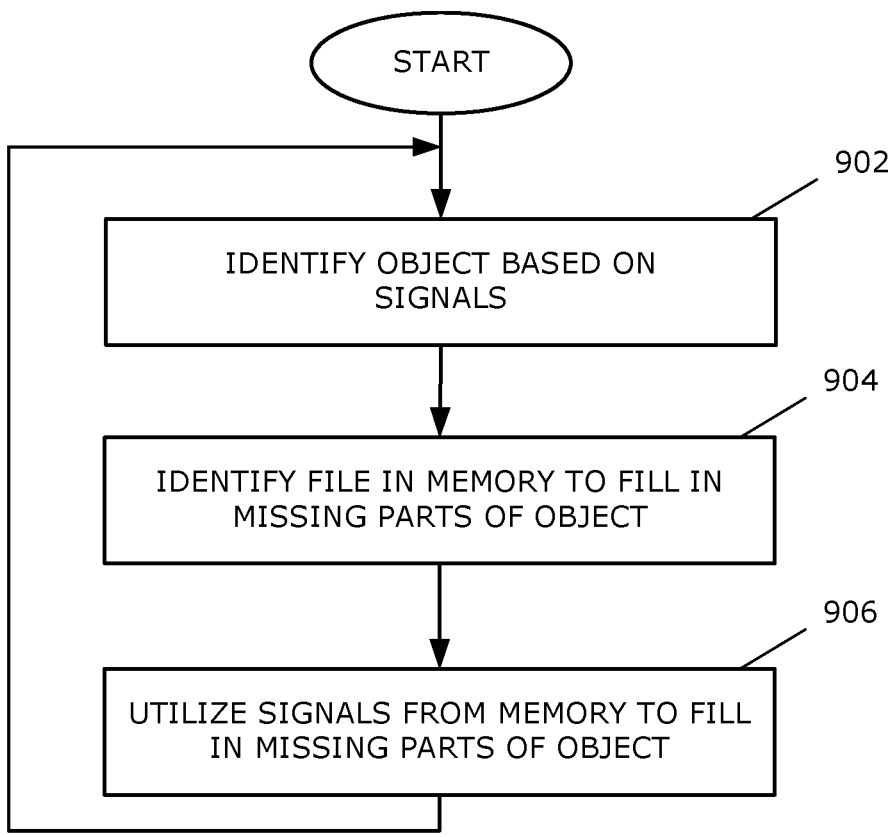
FIG. 9 is a flowchart illustrating an example of a method of controlling the electronic device according to embodiments.

A flowchart illustrating a method of controlling an electronic device, such as the electronic device 500 is shown in FIG. 9. The method may be carried out by software executed, for example, by the main processor 102 of the electronic device 100. Coding of software for carrying out such a method is within the scope of a person of ordinary skill in the art given the present description. The method may contain additional or fewer processes than shown or described, and may be performed in a different order. Computer-readable code executable by at least one processor to perform the method may be stored in a computer-readable medium, such as a non-transitory computer-readable medium.

The method is carried out during a communication session with a remote electronic device, for example, at 410 or between 408 and 410 in the method of FIG. 4. The signals are received at the local electronic device 500, from the remote electronic device 600, in response to externally applied forces that are detected at the remote electronic device 600.

Based on the signals received, the object is identified 902. For example, the signals received may be signals from fingers touching the remote electronic device. In this example, the electronic device 500 determines that the fingers extend to the edges of the interface and are part of a hand.

The electronic device 500 identifies, at 904, a matching file stored in memory based on the identification of the object at 902. The matching file includes information for providing signals to actuators 518 to simulate the fingers and hand of the user of the remote electronic device 600. For example, the electronic device 500 may identify a specific user's hand based on identifying features including the shape and contours of the fingers. Alternatively, the electronic device 500 may identify a suitable hand by size and shape to go with the fingers identified at 902.

In addition to actuating the actuators to simulate the portions of the object that touched the interface at the remote electronic device 600, actuators 518 are actuated to simulate the missing parts of the object utilizing the file identified at 904. Thus, in the example of the fingers touching the remote electronic device 600, in addition to actuating the actuators 518 to simulate the fingers at the electronic device 500, actuators 518 are actuated to control movement and forces applied by pins to simulate the hand.

Thus, the electronic device 500 is operable to add or fill in parts of objects. This method is particularly useful in the example in which the sizes of the electronic devices differ.

As indicated above, the body may be any suitable size. In addition, the body may take any suitable shape. For example, the body may envelop the user. Such a configuration is useful, for example, for simulating a hug or for virtual-reality applications. Other shapes may also be desirable, including a mattress, a chair, or other shape.

Signals sent to the remote electronic device 600 as a result of touch interaction with the electronic device 500 may also be scaled based on the size of each electronic device 500 and the remote electronic device 600. For example, signals resulting from touch contact may alter the area of touch contact at the remote electronic device 600. A ratio may be set automatically based on device sizes. For example, an 8" electronic device in communication with a 4" remote electronic device, may scale touch contact or movements or both by a factor of 2. Alternatively, scaling may be manually entered or may be determined based on predetermined rules. Alternatively, a smaller area of the electronic device 500 may be utilized such that the area of the interface of the electronic device 500 that is utilized is equivalent to the area of the interface of the remote electronic device 600.

Optionally, sensors, such as an accelerometer or other suitable sensors, may be utilized detect movement of the electronic device, for example, when the entire electronic device 500 is being moved, for example, while a user is holding the device in a hand or hands. The electronic device 500 may also determine that no active movement is detected, for example, when the electronic device 500 is set down on a table and is stationary for a threshold period of time. A threshold force may be utilized to determine whether or not to send signals to the remote electronic device 600. Different thresholds may be utilized to determine whether or not to transmit signals resulting from touch interaction depending on whether the electronic device 500 detects movement of the entire device or detects that the device is stationary. For example, an electronic device 500 that is stationary for 10 seconds, may utilize a higher threshold than when the electronic device 500 detects active movement, such that a greater force is required to cause the electronic device 500 to send signals to cause the remote electronic device 600 to apply a force.

Figure 10:
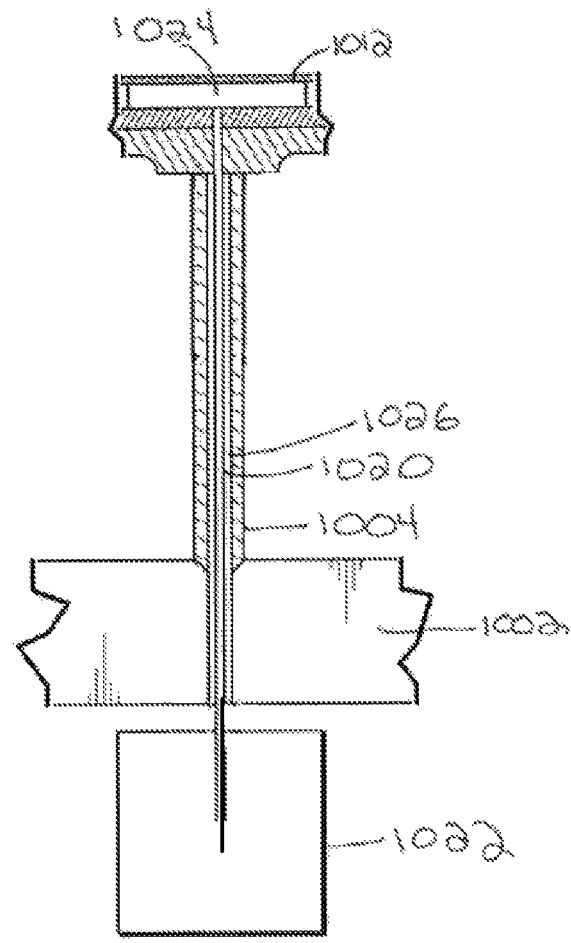
FIG. 10 is a side view of a pin of part of an electronic device in accordance with another embodiment.

Another example of an electronic device is shown in FIG. 10. In this example, a flexible elastic membrane 1012 is coupled to pins 1004. The pins 1004 each include a fluid conduit 1020 that extends through the pin to a reservoir 1022 in the body 1002. The fluid conduit 1020 is utilized for fluid communication between the reservoir 1022 and a respective pocket 1024 between layers of the flexible elastic membrane 1012. The flexible elastic membrane includes a plurality of pockets 1024 for receiving fluid from the reservoir 1022. The fluid may be a gas or a liquid or both gas and liquid. Thus, fluid may be pumped into the pockets 1024 to inflate the flexible elastic membrane 1012. In this example, the pins 1004 are coupled to the flexible elastic membrane 1012 and the flexible elastic membrane 1012 is moved by increasing or decreasing the fluid in the pockets 1024, thereby expanding or collapsing the pockets 1024. When a pocket expands as fluid is pumped into the pocket, the outer surface of the flexible elastic membrane 1012 is moved outwardly, away from the body 1002. When a pocket collapses, the outer surface of the flexible elastic membrane 1012 is moved inwardly, toward the body 1002. Thus, the outer surface of the flexible elastic membrane 1012 is moveable relative to the body 1002.

Actuators 1018 control fluid movement from the reservoir 1022 to the pockets 1024. The actuators 1018 are utilized to cause the fluid to flow along the respective pins 1004 and thereby cause movement of the outer surface of the flexible elastic membrane 1012 relative to the body 1002. Thus, each actuator is individually controllable to control the movement of parts of the outer surface of the flexible elastic membrane 1012. The movement of the flexible elastic membrane 1012 is controlled to simulate touch contact. The fluid may be warmed or cooled, utilizing a heating element or a cooling fluid disposed in the area 1026 around the fluid conduit 1020 such that the fluid provides heat or is cool to the touch for improved simulation of touch.

Force sensors are also associated with the flexible elastic membrane 1012, for example, to detect external forces applied to the flexible elastic membrane 1012.

The method shown in FIG. 4 and described herein is also applicable to the electronic device shown in FIG. 10. The method may be carried out by software executed, for example, by a main processor (not shown) of the electronic device. Details of the method shown in FIG. 4 and described above are also applicable to the electronic device 500 and are therefore not described again herein.

Thus, during a communication session, externally applied forces on the interface of the local electronic device 1000 are detected and, in response, signals are transmitted to the remote electronic device. Signals are also received at the local electronic device 1000 in response to externally applied forces that are detected at the remote electronic device.

In response to receipt of signals at the local electronic device at 408, the actuators 1018 are actuated at 410 to control movement of portions of the flexible elastic membrane 1012 to thereby control movement and forces applied by the flexible elastic membrane 1012.

Because the flexible elastic membrane 1012 is movable toward and away from the body 302, the flexible elastic membrane 1012 is operable to apply a force to an object touching the flexible elastic membrane 1012. In addition, the flow of fluid into the pockets 1024 is controlled to form a shape, such as a projection, that generally follows the contours and surface profile of an object touching the interface of a remote device that is in communication with the electronic device 1000. Utilizing the movement of the flexible elastic membrane 1012 and force application, the electronic device 1000, in cooperation with a remote electronic device, simulates touch between two people that are each utilizing a respective one of the electronic devices.

Figure 11:
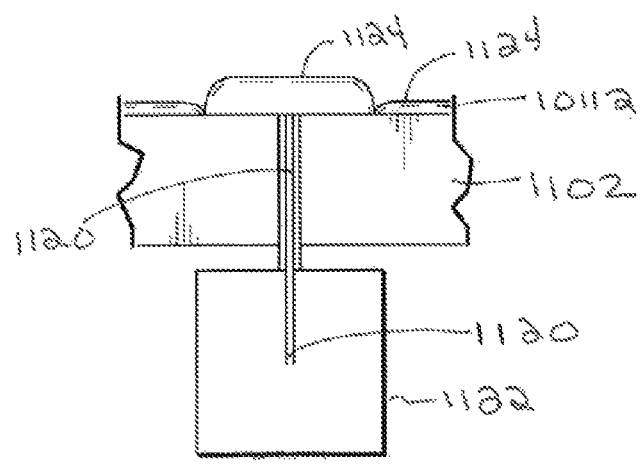
FIG. 11 is a side view of a pin of part of an electronic device in accordance with another embodiment.

Yet another example of an electronic device is shown in FIG. 11. In this example, a flexible elastic membrane 1112 is coupled to the body 1102. The flexible elastic membrane 1112 includes a plurality of pockets 1124 for receiving fluid therein. Fluid conduits 1120 extend through an upper surface of the body 1102 to a reservoir 1122 in the body 1102. The fluid conduits 1120 are utilized for fluid communication between the reservoir 1122 and respective pockets 1124 between layers of the flexible elastic membrane 1112. The fluid may be a gas or a liquid or both gas and liquid. Thus, fluid may be pumped into the pockets 1124 to inflate the flexible elastic membrane 1112. The flexible elastic membrane 1112 is moved by increasing or decreasing the fluid in the pockets 1124, thereby expanding or collapsing the pockets 1124. When a pocket expands as fluid is pumped into the pocket, the outer surface of the flexible elastic membrane 1112 is moved outwardly, away from the body 1102. When a pocket collapses, the outer surface of the flexible elastic membrane 1112 is moved inwardly, toward the body 1102. Thus, the outer surface of the flexible elastic membrane 1112 is moveable relative to the body 1102.

A controller controls fluid movement from the reservoir 1122 to the pockets 1124 and from the pockets 1124 to the reservoir 1122. The controller is utilized, in conjunction with valves, to cause the fluid to flow through the fluid conduits 1020, which include apertures in a surface of the body 1102 and thereby cause movement of the outer surface of the flexible elastic membrane 1112 relative to the body 1102. Thus, the controller, which may include valves, for example, controls the movement of parts of the outer surface of the flexible elastic membrane 1112. The movement of the flexible elastic membrane 1112 is controlled to simulate touch contact. The fluid may be warmed or cooled such that the fluid provides heat or is cool to the touch for improved simulation of touch.

Force sensors are also associated with the flexible elastic membrane 1112, for example, to detect external forces applied to the flexible elastic membrane 1112.

The method shown in FIG. 4 and described herein is also applicable to the electronic device shown in FIG. 11. The method may be carried out by software executed, for example, by a main processor (not shown) of the electronic device. Details of the method shown in FIG. 4 and described above are also applicable to the electronic device 500 and are therefore not described again herein.

Thus, during a communication session, externally applied forces on the interface of the local electronic device 1100 are detected and, in response, signals are transmitted to the remote electronic device. Signals are also received at the local electronic device 1100 in response to externally applied forces that are detected at the remote electronic device.

In response to receipt of signals at the local electronic device at 408, the controller controls movement of portions of the flexible elastic membrane 1112 to thereby control movement and forces applied by the flexible elastic membrane 1112.

Because the flexible elastic membrane 1112 is movable toward and away from the body 1102, the flexible elastic membrane 1112 is operable to apply a force to an object touching the flexible elastic membrane 1112. In addition, the flow of fluid into the pockets 1124 is controlled to form a shape, such as a projection, that generally follows the contours and surface profile of an object touching the interface of a remote device that is in communication with the electronic device 1100. Utilizing the movement of the flexible elastic membrane 1112 and force application, the electronic device 1100, in cooperation with a remote electronic device, simulates touch between two people that are each utilizing a respective one of the electronic devices.

Figure 12:
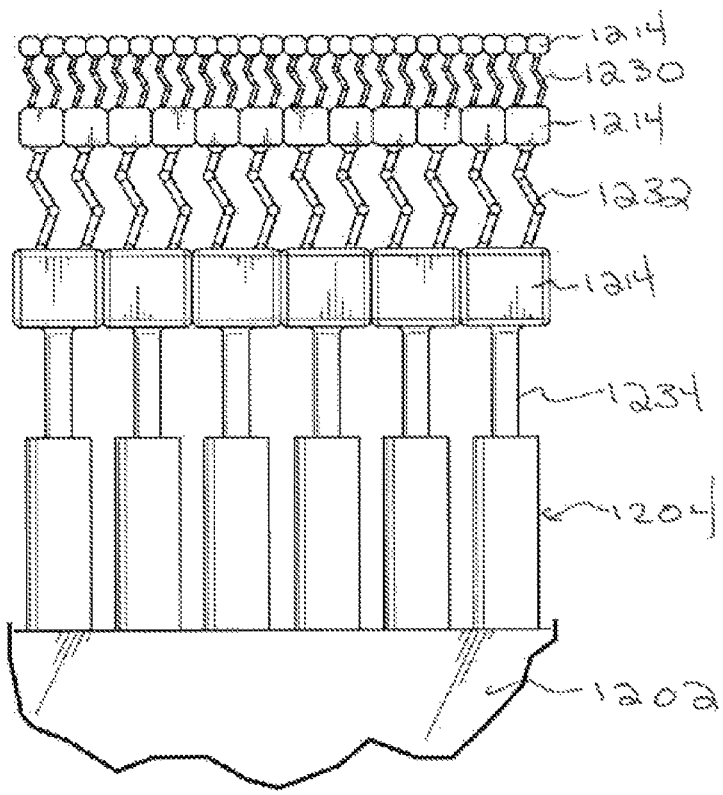
FIG. 12 is a side view of part of yet a further example of an electronic device in accordance with yet another embodiment.

Referring to FIG. 12 and as indicated above, pins 1204 may be disposed on a body 1202 such that the heads 1214 of the pins 1204 are disposed in different layers relative to the body 1202. Thus, the heads 1214 on the pins are generally stacked on the body 1202. Stacking of heads 1214 facilitates detection of forces and movement at greater depths, for example, for simulating a handshake or a hug. The stacked heads 1214 also facilitate movement of the heads to cause a change in volume, for example, as heads move around from a stacked position to project outwardly, laterally or otherwise. Images may be displayed on sides of the heads 1214 as well as a top. When the pins are stacked, the images on the tops of the heads 1214 and on the sides of the heads 1214 provide depth to the image.

The pins 1204 are grouped such that groups of the pins 1204 move together relative to the body 1202. For example, outer groups of pins 1230 are disposed on intermediate groups of pins 1232, which are disposed on inner groups of pins 1234. In this example, the pins 1204 of the outer groups of pins 1230 are smaller than the pins 1204 of the intermediate groups of pins 1232 and the pins 1204 of the intermediate groups of pins 1232 are smaller than the pins 1204 of the inner groups of pins 1232. Thus, a plurality of pins of an outer group of pins 120 is disposed on one of the intermediate pins 1232. Similarly, a plurality of pins of an intermediate group of pins is disposed on one of the inner pins 1234.

Movement of one of the inner groups of pins 1234 results in movement of the associated intermediate groups of pins 1232 and the associated outer groups of pins 1230. The outer groups of pins 1230, the intermediate groups of pins 1232, and the inner groups of pins 1234 include respective couplings or joints facilitating movement of the pins in three dimensions. Thus, the groups, also referred to as clusters of pins may swivel or pivot together relative to the body 120. The movement of the pins 1204 is controlled programmatically to facilitate the movement of individual pins 1204 together as a group and to control the movement of groups of pins 1204 together.

Figure 13:
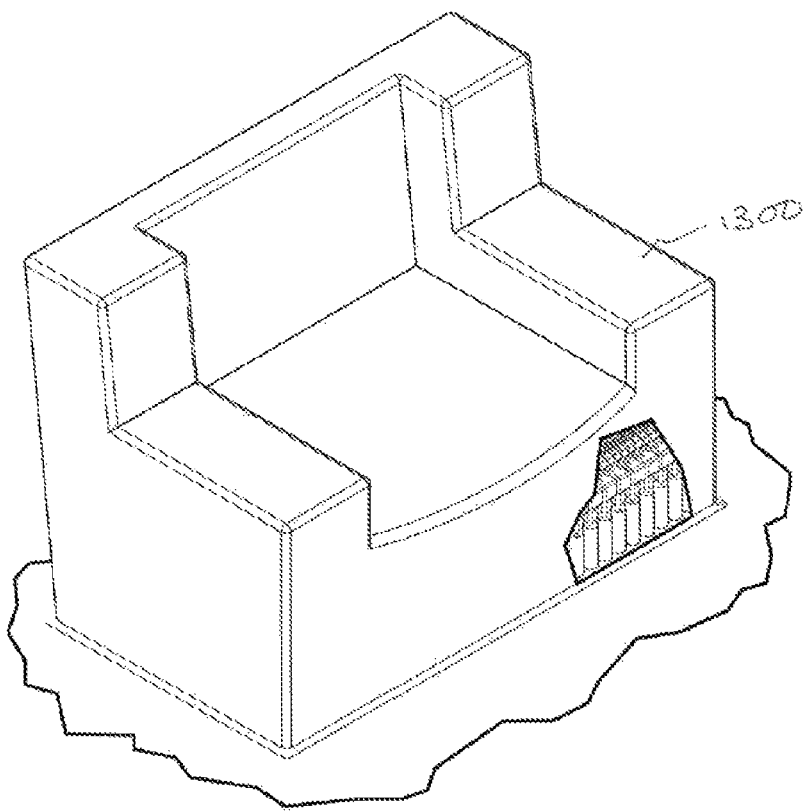
FIG. 13 is a perspective view of the electronic device of FIG. 12, with the pins of the electronic device in the shape of a chair.

The movement of groups of pins facilitates the simulation of complex touch interactions. In addition, the pins 1204 may move to form complex shapes, such as the chair 1300 illustrated in FIG. 13.

The described embodiments are to be considered as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. A method of controlling an electronic device including a plurality of pins extending from a body, the pins including couplings to facilitate movement of a first portion of the pins relative to a second portion of the pins and a plurality of heads disposed on the pins, each head including a plurality of facets, wherein each facet of the plurality of facets has a different material property, the pins being controllable to control the movement of the first portion relative to the second portion and to control a force applied by the pins on an external object, sensors cooperating with the pins to detect forces externally applied to the pins, a communication subsystem for communication, over a network, with a remote electronic device, and a controller coupled to the pins, the sensors, and the communication subsystem, the method comprising:

initiating communication with the remote electronic device;

based on detected forces externally applied to the pins, transmitting a signal to the remote electronic device for controlling the remote electronic device to simulate the detected force externally applied to the pins;

based on signals received from the remote electronic device in response to a remote force detected at the remote electronic device, actuating ones of the pins to control the movement of the first portion relative to the second portion and to control the force applied by the pins on the external object to simulate the remote force detected at the remote electronic device.

2. The method according to claim 1, wherein initiating communication comprises performing a handshake process.

3. The method according to claim 1, wherein initiating communication comprises a user authentication or identification process.

4. The method according to claim 1, comprising, based on the signals received from the remote electronic device, determining a magnitude of the remote force applied at the remote electronic device, comparing the magnitude to a threshold value, and actuating the pins of the electronic device to simulate the remote force applied at the remote electronic device in response to determining that the magnitude is less than the threshold value.

5. The method according to claim 4, comprising, in response to determining that the remote force applied at the remote electronic device is greater than the threshold value, actuating the pins of the electronic device to apply an altered force to the external object such that the altered force is less than the threshold value.

6. The method according to claim 1, comprising determining a magnitude of the detected force applied to the pins of the electronic device and, in response to determining that the magnitude of the detected force exceeds a threshold value, interrupting transmitting signals to the remote electronic device such that signals related to the detected force that exceeds the threshold value are not transmitted to the remote electronic device.

7. The method according to claim 1, comprising identifying, by the electronic device, a remote object applying the remote force based on the signals received from the remote electronic device.

8. The method according to claim 7, utilizing additional stored information based on the identification of the remote object applying the remote force, to actuate further pins to simulate additional parts of the remote object at the electronic device.

9. The method according to claim 1, comprising detecting touches utilizing touch sensors disposed on heads disposed on the pins of the electronic device.

10. The method according to claim 1, wherein in response to detecting a touch utilizing capacitive touch sensors disposed on heads disposed on the pins of the electronic device, heating the heads to simulate skin contact.

11. The method according to claim 1, comprising storing information relating to the communication to reproduce the simulation of the force detected at the remote electronic device at a later time, after the communication with the remote electronic device ends.

12. The method according to claim 1, comprising displaying images on heads disposed on the pins.

13. The method according to claim 1, wherein at least one additional facet is added to the plurality of facets, the at least one additional facet duplicating a material property of an existing facet.

14. A non-transitory computer-readable medium having stored thereon, computer-readable code executable by at least one processor of a computing device to perform the method of claim 1.

\* \* \* \* \*